(12) United States Patent
Phillipps et al.

(10) Patent No.: US 10,423,889 B2
(45) Date of Patent: Sep. 24, 2019

(54) NATIVE MACHINE LEARNING INTEGRATION FOR A DATA MANAGEMENT PRODUCT

(71) Applicant: PurePredictive, Inc., Sandy, UT (US)

(72) Inventors: Kelly D. Phillipps, Salt Lake City, UT (US); Richard W. Wellman, Park City, UT (US); Milind D. Zodge, Midvale, UT (US)

(73) Assignee: PUREPREDICTIVE, INC., Sandy, UT (US)

( * ) Notice: Subject to any disclaimer, the term of this patent is extended or adjusted under 35 U.S.C. 154(b) by 632 days.

(21) Appl. No.: 14/150,327

(22) Filed: Jan. 8, 2014

(65) Prior Publication Data

US 2014/0195466 A1    Jul. 10, 2014

Related U.S. Application Data

(60) Provisional application No. 61/750,281, filed on Jan. 8, 2013.

(51) Int. Cl.
*G06F 17/30* (2006.01)
*G06N 3/08* (2006.01)
(Continued)

(52) U.S. Cl.
CPC ........... *G06N 20/00* (2019.01); *G05B 13/048* (2013.01); *G06F 16/00* (2019.01); *G06Q 10/04* (2013.01)

(58) Field of Classification Search
None
See application file for complete search history.

(56) References Cited

U.S. PATENT DOCUMENTS

| 3,327,291 A | 6/1967 | Lee |
| 5,719,692 A | 2/1998 | Cohen |

(Continued)

FOREIGN PATENT DOCUMENTS

| DE | 102010046439 | 3/2012 |
| WO | 2012151198 | 11/2012 |
| WO | 2014110167 | 7/2014 |

OTHER PUBLICATIONS

Oracle Database 11g: Data Mining Techniques Activity Guide [online], Feb. 2012 [retrieved on Nov. 28, 2015]. Retrieved from the Internet:<http://www.google.com/url?sa=t&rct=j&q=&esrc=s&source=web&cd=7&ved=0ahUKEwi_4qqy0bbJAhUMIYgKHcXzDGgQFghOMAY&url=http%3A%2F%2Fwww.cs.utexas.edu%2F~cannata%2FdataSci%2FClass%2520Notes%2FODM%2520Activity>.*

(Continued)

*Primary Examiner* — Robert A Cassity
*Assistant Examiner* — Robert Bejcek, II
(74) *Attorney, Agent, or Firm* — Kunzler Bean & Adamson, PC

(57) ABSTRACT

Apparatuses, systems, methods, and computer program products are disclosed for machine learning in a data management product. The apparatus includes an input module, a learned function module, and a results module. The input module is configured to receive an analysis request for the data management product. The learned function module is configured to execute one or more machine learning ensembles to predict one or more unknown values for the data management product. The result module is configured to provide native access, within the data management product, to the one or more unknown values.

14 Claims, 11 Drawing Sheets

(51) Int. Cl.
　　　*G06Q 10/04*　　　(2012.01)
　　　*G06N 20/00*　　　(2019.01)
　　　*G05B 13/04*　　　(2006.01)
　　　*G06F 16/00*　　　(2019.01)

(56) References Cited

U.S. PATENT DOCUMENTS

| | | |
|---|---|---|
| 5,832,467 A | 11/1998 | Wavish |
| 5,832,468 A | 11/1998 | Miller et al. |
| 5,963,910 A | 10/1999 | Ulwick |
| 6,018,619 A | 1/2000 | Allard et al. |
| 6,112,304 A | 8/2000 | Clawson |
| 6,491,367 B1 | 12/2002 | Miyasaka et al. |
| 6,507,726 B1 | 1/2003 | Atkinson et al. |
| 6,523,015 B1 | 2/2003 | Bera et al. |
| 6,523,035 B1* | 2/2003 | Fleming .............. G06F 17/3056 707/770 |
| 6,894,972 B1 | 5/2005 | Phaal |
| 7,023,979 B1 | 4/2006 | Wu et al. |
| 7,219,085 B2 | 5/2007 | Buck et al. |
| 7,328,218 B2 | 2/2008 | Steinberg et al. |
| 7,480,640 B1 | 1/2009 | Elad et al. |
| 7,499,897 B2 | 3/2009 | Pinto et al. |
| 7,600,007 B1 | 10/2009 | Lewis |
| 7,689,520 B2 | 3/2010 | Burges et al. |
| 7,814,194 B2 | 10/2010 | Hellerstein et al. |
| 7,890,929 B1 | 2/2011 | Johanson |
| 7,996,415 B1 | 8/2011 | Raffill et al. |
| 8,116,207 B2 | 2/2012 | Schekochikhin et al. |
| 8,160,981 B2 | 4/2012 | Aparicio |
| 8,209,271 B1 | 6/2012 | Lin et al. |
| 8,209,274 B1 | 6/2012 | Lin et al. |
| 8,214,308 B2 | 7/2012 | Chu |
| 8,229,864 B1 | 7/2012 | Lin et al. |
| 8,250,009 B1 | 8/2012 | Breckenridge et al. |
| 8,260,117 B1 | 9/2012 | Xu et al. |
| 8,271,536 B2 | 9/2012 | Amradkar et al. |
| 8,311,967 B1 | 11/2012 | Lin et al. |
| 8,370,279 B1 | 2/2013 | Lin et al. |
| 8,370,280 B1 | 2/2013 | Lin et al. |
| 8,443,438 B1 | 5/2013 | Sharir et al. |
| 8,527,324 B2 | 9/2013 | Richter |
| 8,572,290 B1 | 10/2013 | Mukhopadhyay et al. |
| 8,601,030 B2 | 12/2013 | Bagchi et al. |
| 8,781,995 B2 | 7/2014 | Stergiou et al. |
| 8,880,446 B2 | 11/2014 | Wellman et al. |
| 8,965,814 B1 | 2/2015 | Rangan |
| 9,081,805 B1 | 7/2015 | Stamen et al. |
| 9,082,083 B2 | 7/2015 | Virkar et al. |
| 9,218,574 B2 | 12/2015 | Phillipps et al. |
| 2002/0107712 A1 | 8/2002 | Lam et al. |
| 2002/0159641 A1 | 10/2002 | Whitney et al. |
| 2002/0184408 A1 | 12/2002 | Hannigan et al. |
| 2003/0069869 A1 | 4/2003 | Gronau et al. |
| 2003/0088425 A1 | 5/2003 | Lam et al. |
| 2003/0097302 A1 | 5/2003 | Overhultz et al. |
| 2004/0059966 A1 | 3/2004 | Chan et al. |
| 2004/0078175 A1 | 4/2004 | Shaw et al. |
| 2004/0243527 A1 | 12/2004 | Gross |
| 2005/0076245 A1 | 4/2005 | Graham et al. |
| 2005/0090911 A1 | 4/2005 | Ingargiola et al. |
| 2005/0132052 A1 | 6/2005 | Uttamchandani et al. |
| 2005/0228789 A1 | 10/2005 | Fawcett et al. |
| 2005/0267913 A1 | 12/2005 | Stienhans et al. |
| 2005/0278362 A1 | 12/2005 | Maren et al. |
| 2006/0247973 A1 | 11/2006 | Mueller et al. |
| 2007/0043690 A1 | 2/2007 | Inakoshi et al. |
| 2007/0111179 A1 | 5/2007 | Hochwarth et al. |
| 2007/0112824 A1 | 5/2007 | Lock et al. |
| 2008/0043617 A1 | 2/2008 | Schekochikhin et al. |
| 2008/0162487 A1 | 7/2008 | Richter |
| 2008/0168011 A1 | 7/2008 | Steinberg |
| 2008/0313110 A1 | 12/2008 | Kreamer et al. |
| 2009/0023798 A1 | 1/2009 | Magda et al. |
| 2009/0035733 A1 | 2/2009 | Meitar et al. |
| 2009/0083232 A1 | 3/2009 | Ives et al. |
| 2009/0089030 A1 | 4/2009 | Sturrock et al. |
| 2009/0089078 A1 | 4/2009 | Bursey |
| 2009/0177646 A1 | 7/2009 | Pham et al. |
| 2009/0186329 A1 | 7/2009 | Connor |
| 2009/0222742 A1 | 9/2009 | Pelton et al. |
| 2009/0254379 A1 | 10/2009 | Adams et al. |
| 2009/0327172 A1 | 12/2009 | Liu et al. |
| 2010/0009330 A1 | 1/2010 | Yaskin |
| 2010/0010878 A1 | 1/2010 | Pinto et al. |
| 2010/0010948 A1 | 1/2010 | Ito et al. |
| 2010/0023798 A1 | 1/2010 | Meijer et al. |
| 2010/0030720 A1 | 2/2010 | Stephens |
| 2010/0100519 A1 | 4/2010 | Aaron et al. |
| 2010/0114663 A1 | 5/2010 | Casas et al. |
| 2010/0131314 A1 | 5/2010 | Lo Yuk Ting et al. |
| 2010/0138026 A1 | 6/2010 | Kaushal et al. |
| 2010/0145902 A1 | 6/2010 | Boyan et al. |
| 2010/0205125 A1 | 8/2010 | Whitehead et al. |
| 2010/0223212 A1 | 9/2010 | Manolescu et al. |
| 2010/0306141 A1 | 12/2010 | Chidlovskii |
| 2011/0022704 A1 | 1/2011 | Duan et al. |
| 2011/0111384 A1 | 5/2011 | Dietrich et al. |
| 2011/0119300 A1 | 5/2011 | Marcade |
| 2011/0137672 A1 | 6/2011 | Adams et al. |
| 2011/0161055 A1 | 6/2011 | Cases et al. |
| 2011/0184575 A1 | 7/2011 | Kawamoto et al. |
| 2011/0265069 A1 | 10/2011 | Fee et al. |
| 2011/0288867 A1 | 11/2011 | Chengalvarayan et al. |
| 2011/0302111 A1 | 12/2011 | Chidlovskii |
| 2011/0302153 A1 | 12/2011 | Meretakis et al. |
| 2011/0307889 A1 | 12/2011 | Moriki et al. |
| 2012/0004893 A1 | 1/2012 | Vaidyanathan et al. |
| 2012/0030160 A1 | 2/2012 | Ratnam et al. |
| 2012/0030166 A1 | 2/2012 | Ratnam et al. |
| 2012/0072367 A1 | 3/2012 | Reisbich |
| 2012/0078825 A1 | 3/2012 | Kulkarni et al. |
| 2012/0079134 A1 | 3/2012 | Outhred et al. |
| 2012/0143995 A1 | 6/2012 | Calvin et al. |
| 2012/0158620 A1 | 6/2012 | Paquet et al. |
| 2012/0158624 A1 | 6/2012 | Lingenfelder et al. |
| 2012/0191630 A1 | 7/2012 | Breckenridge et al. |
| 2012/0191631 A1 | 7/2012 | Breckenridge et al. |
| 2012/0221503 A1 | 8/2012 | Williamson |
| 2012/0284212 A1 | 11/2012 | Lin et al. |
| 2012/0284213 A1 | 11/2012 | Lin et al. |
| 2012/0284600 A1 | 11/2012 | Lin et al. |
| 2012/0330971 A1 | 12/2012 | Thomas et al. |
| 2013/0004930 A1 | 1/2013 | Sorenson et al. |
| 2013/0066886 A1 | 3/2013 | Bagchi et al. |
| 2013/0074091 A1 | 3/2013 | Xavier et al. |
| 2013/0086247 A1 | 4/2013 | Burckart et al. |
| 2013/0086255 A1 | 4/2013 | Burckart et al. |
| 2013/0091001 A1 | 4/2013 | Jia et al. |
| 2013/0191257 A1 | 7/2013 | Koodli et al. |
| 2013/0197966 A1 | 8/2013 | Liebman |
| 2013/0197967 A1 | 8/2013 | Pinto et al. |
| 2013/0218042 A1 | 8/2013 | Mardirossian |
| 2014/0136452 A1 | 5/2014 | Wellman et al. |
| 2014/0180738 A1 | 6/2014 | Phillipps et al. |
| 2014/0195466 A1 | 7/2014 | Phillipps et al. |
| 2014/0205990 A1 | 7/2014 | Wellman et al. |
| 2014/0215050 A1 | 7/2014 | Lu |
| 2014/0236875 A1 | 8/2014 | Phillipps et al. |
| 2014/0280492 A1 | 9/2014 | Yang et al. |
| 2014/0358825 A1 | 12/2014 | Phillipps et al. |
| 2014/0358828 A1 | 12/2014 | Phillipps et al. |
| 2014/0372346 A1 | 12/2014 | Phillipps et al. |
| 2014/0372513 A1 | 12/2014 | Jones |
| 2015/0058266 A1 | 2/2015 | Wellman et al. |
| 2015/0213372 A1 | 7/2015 | Shah et al. |
| 2015/0381552 A1 | 12/2015 | Vijay et al. |

OTHER PUBLICATIONS

Oracle Data Mining 11g Release 2 Competing on In-Database Analytics, An Oracle White Paper [online], Feb. 2012 [retrieved on Nov. 29, 2015]. Retrieved from the Internet:<URL:http://www.

(56) References Cited

OTHER PUBLICATIONS google.com/url?sa=t&rct=j&q=&esrc=s&source=web&cd=2&ved=0ahUKEwiWue6j2arJAhXYKogKHXU6AtQQFgghMAE&url=http%3A%2F%2Fwww.oracle.com%2Ftechnetwork%2Fdatabase>.*
Nanni et al. A classifier ensemble approach for the missing feature problem. Artificial Intelligence in Medicine 55 (2012) 37-50.*
Jiang et al. Classification for Incomplete Data Using Classifier Ensembles. International Conference on Neural Networks and Brain, 2005. ICNN&B '05.*
Prodromidis et al. Cost Complexity-Based Pruning of Ensemble Classifers. Knowledge and Information Systems (2001) 3: 449-469.*
Kuncheva, Ludmila. Classifier Ensembles for Changing Environments. F. Roli, J. Kittler, and T. Windeatt (Eds.): MCS 2004, LNCS 3077, pp. 1-15, 2004.*
Gordon, Kurtiss. Spreadsheet or Database: Which Makes More Sense? Journal of Computing in Higher Education. Spring 1999, vol. 10(2), 111-116. Abstract Only.*
Pan et al. Towards better accuracy for missing value estimation of epistatic miniarray profiling data by a novel ensemble approach. Genomics 97 (2011) 257-264.*
Lakshminarayan et al. Imputation of missing data using machine learning techniques. KDD-96 Proceedings. (Year: 1996).*
McTigue, Jake, "Predictive Analytics for IT", InformationWeek Reports, Mar. 2012, pp. 17, Reports. InformationWeek.com.
Purpura, Stephen, "Statistically Adaptive Learning for a General Class of Cost Functions (SA L-BFGS)", Sep. 5, 2012, pp. 7, arXiv:1209.0029v3 [cs.LG] Sep. 5, 2012.
U.S. Appl. No. 13/870,861, Office Action, dated Sep. 12, 2013.
Kolter, J. Zico, et al., "Dynamic Weighted Majority: An Ensemble Method for Drifting Concepts", Journal of Machine Learning Research 8, 2007, pp. 2755-2790.
Application No. PCT/US2013/077236, International Search Report and Written Opinion, dated Feb. 24, 2014.
Application No. PCT/US2013/070358, International Search Report and Written Opinion, dated Feb. 28, 2014.
Application No. PCT/US14/42104, International Search Report and Written Opinion, dated Dec. 17, 2014.
U.S. Appl. No. 13/749,618, Office Action, dated Dec. 22, 2014.
Cabena, et al., "Intelligent Miner for Data Applications Guide", IBM, 1998, pp. 89-103.
U.S. Appl. No. 13/725,995, Office Action, dated Apr. 2, 2015.
Ilijasic, Lovro, "Computational Grids as Complex Networks", Torino, 2010.
"HP Process Resource Manager User's Guide", Hewlett-Packard Development Company, Version C.03.05, Jan. 2009.
Application No. PCT/US2014/013028, International Search Report and Written Opinion, dated May 15, 2014.
U.S. Appl. No. 13/870,861, Notice of Allowance, dated Jun. 20, 2014.
Bennett, Casey C., "EHRs Connect Research and Practice: Where Predictive Modeling, Artificial Intelligence, and Clinical Decision Support Intersect", Health Policy and Technology (2012), pp. 24.
Steinberg, Dan, "CART 6.0", Salford Systems, 2006, pp. 440, www.salford-systems, com.
"SPM Features", Salford Systems—Data Mining and Predictive Analytics Software, downloaded Apr. 30, 2015, pp. 5, https://www.walford-systems, com/products/spm-features.
U.S. Appl. No. 13/904,963, Office Action, dated May 15, 2015.
Cabena P., "Intelligent Miner for Data Applications Guide", IBM Corporation, International Technical Support Organization, 1999.
Kolter, J., et al., "Dynamic Weighted Majority: An Ensemble Method for Drifting Concepts", Journal of Machine Learning Research, 8, 2007, pp. 2755-2790.
Purpura, S., et al., "Statistically Adaptive Learning for a General Class of Cost Functions (SA L-BFGS)", 2012.
Frank E., et al., "Weka—A Machine Learning Workbench for Data Mining", Data Mining and Knowledge Discovery Handbook, 2nd ed., 2010.
Hall, M., et al., "The WEKA Data Mining Software: An Update", SIGKDD Explorations, vol. 11, Issue 1, 2009.
Application No. PCT/US2013/070358, International Preliminary Report on Patentability, dated May 28, 2015.
U.S. Appl. No. 13/749,618, Office Action, dated Jul. 8, 2014.
PCT/US2013/077236, International Preliminary Report on Patentability, dated Jul. 2, 2015.
PCT/US2014/013028, International Preliminary Report on Patentability, dated Aug. 6, 2015.
PCT/US2014/010729, International Preliminary Report on Patentability, dated Jul. 23, 2015.
Application No. PCT/US14/10729, International Search Report and Written Opinion, dated Aug. 28, 2014.
Application No. PCT/US14/39859, International Search Report and Written Opinion, dated Oct. 16, 2014.
Application No. PCT/US14/39861, International Search Report and Written Opinion, dated Oct. 16, 2014.
Application No. PCT/US14/42754, International Search Report and Written Opinion, dated Oct. 15, 2014.
U.S. Appl. No. 13/870,861, Office Action, dated Apr. 8, 2014.
U.S. Appl. No. 14/014,322, Office Action, dated Aug. 27, 2015.
U.S. Appl. No. 13/725,995, Office Action, dated Sep. 24, 2015.
Ilijasic, Lovro, "Computational Grids as Complex Networks", Torino, pp. 130, 2010.
"HP Process Resource Manager User's Guide Version C.03.05", Hewlett-Packard Development Company, pp. 111, Jan. 2009.
U.S. Appl. No. 14/531,893, Office Action, dated Sep. 25, 2015.
Kolter, J. Zico, "Dynamic Weighted Majority: An Ensemble Method for Drifting Concepts", Journal of Machine Learning Research, pp. 36, Dec. 2007.
Application No. PCT/US2014/039861, International Preliminary Report on Patentability, dated Dec. 10, 2015.
Application No. PCT/US2014/039859, International Preliminary Report on Patentability, dated Dec. 10, 2015.
Application No. PCT/US2014/042104, International Preliminary Report on Patentability, dated Dec. 23, 2015.
Application No. PCT/US2014/042754, International Preliminary Report on Patentability, dated Dec. 30, 2015.
U.S. Appl. No. 14/162,571 Final Rejection dated Jun. 29, 2016.
U.S. Appl. No. 14/266,119 Non-Final Rejection dated Jul. 22, 2016.
U.S. Appl. No. 13/904,963, Notice of Allowance, dated Oct. 20, 2015.
U.S. Appl. No. 14/266,119 Notice of Allowance dated Jan. 4, 2017.
U.S. Appl. No. 14/162,571 Non-Final Rejection dated Feb. 23, 2017.
U.S. Appl. No. 14/162,571, Office Action, dated Jan. 4, 2016.
U.S. Appl. No. 14/266,093 Office Action dated Apr. 6, 2017.
European Application No. 13854635.3 extended European Search Report dated Jun. 2, 2017.
European Application No. 14803832.6 extended European Search Report dated Jul. 6, 2017.
European Application No. 14803583.5 extended European Search Report dated Jul. 4, 2017.
U.S. Appl. No. 13/749,618 Decision on Appeal dated Jul. 25, 2017.
P. Cabena et al. "Intelligent Miner for Data Applications Guide," IBM, pp. 89-103 (Mar. 1999).
U.S. Appl. No. 14/162,571 Office Action dated Sep. 7, 2017.
U.S. Appl. No. 14/266,093 Non-Final Rejection dated Oct. 5, 2017.
U.S. Appl. No. 14/266,093 Final Rejection dated Jun. 13, 2018.
U.S. Appl. No. 14/162,571 Final Rejection dated Jun. 1, 2018.
U.S. Appl. No. 14/266,093 Non-Final Rejection dated May 15, 2019.
De Bock, K.W., & Van den Poel, D. (Jun. 2010). Ensembles of probability estimation trees for customer churn prediction. In international Conference on Industrial, Engineering and Other Applications of Applied Intelligent Systems (pp. 57-66). Springer, Berlin, Heidelberg.

* cited by examiner

NATIVE MACHINE LEARNING INTEGRATION FOR A DATA MANAGEMENT PRODUCT

CROSS-REFERENCES TO RELATED APPLICATIONS

This application claims priority to U.S. Provisional Patent Application No. 61/750,281 entitled "Integrated Machine Learning for a Data Management Product" and filed on Jan. 8, 2013 for Kelly D. Phillipps et al., which is incorporated herein by reference.

TECHNICAL FIELD

The present disclosure, in various embodiments, relates to data management products and more particularly relates to integrated machine learning for a data management product.

BACKGROUND

Data management products, such as database systems, spreadsheets, or the like, are often used to query, manipulate, store, access, or otherwise manage data. Data management products typically provide a variety of native functions and methods for managing data. The native functions and methods of a data management product allow the underlying data to be queried and manipulated, but the native functions and methods are typically limited to the stored data. Native data management functions and methods do not provide a trained machine learning interface to users or provide users with trained machine learning predictions using underlying data.

SUMMARY

Apparatuses are presented for machine learning in a data management product. In one embodiment, an input module is configured to receive an analysis request for a data management product. A learned function module, in a further embodiment, is configured to execute one or more machine learning ensembles to predict one or more unknown values for a data management product. A result module, in certain embodiments, is configured to provide native access, within a data management product, to one or more unknown values.

Methods for machine learning in a data management product are presented. In one embodiment, a method includes receiving an analysis request for a data management product. A method, in a further embodiment, includes executing one or more machine learning ensembles to predict one or more unknown values for a data management product. A method, in another embodiment, includes providing native access, within a data management product, to one or more predicted values corresponding to one or more unknown values.

Other methods for machine learning in a data management product are presented. A method, in one embodiment, includes providing a machine learning module in communication with a data management product. In another embodiment, a method includes transmitting a new ensemble request from a data management product to a machine learning module. A method, in certain embodiments, includes receiving training data from a data management product. In a further embodiment, a method includes generating a plurality of learned functions using training data. In certain embodiments, a method includes forming a machine learning ensemble based on a plurality of learned functions. A method, in one embodiment, includes integrating a machine learning ensemble with a data management product to provide access to machine learning results within the data management product.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
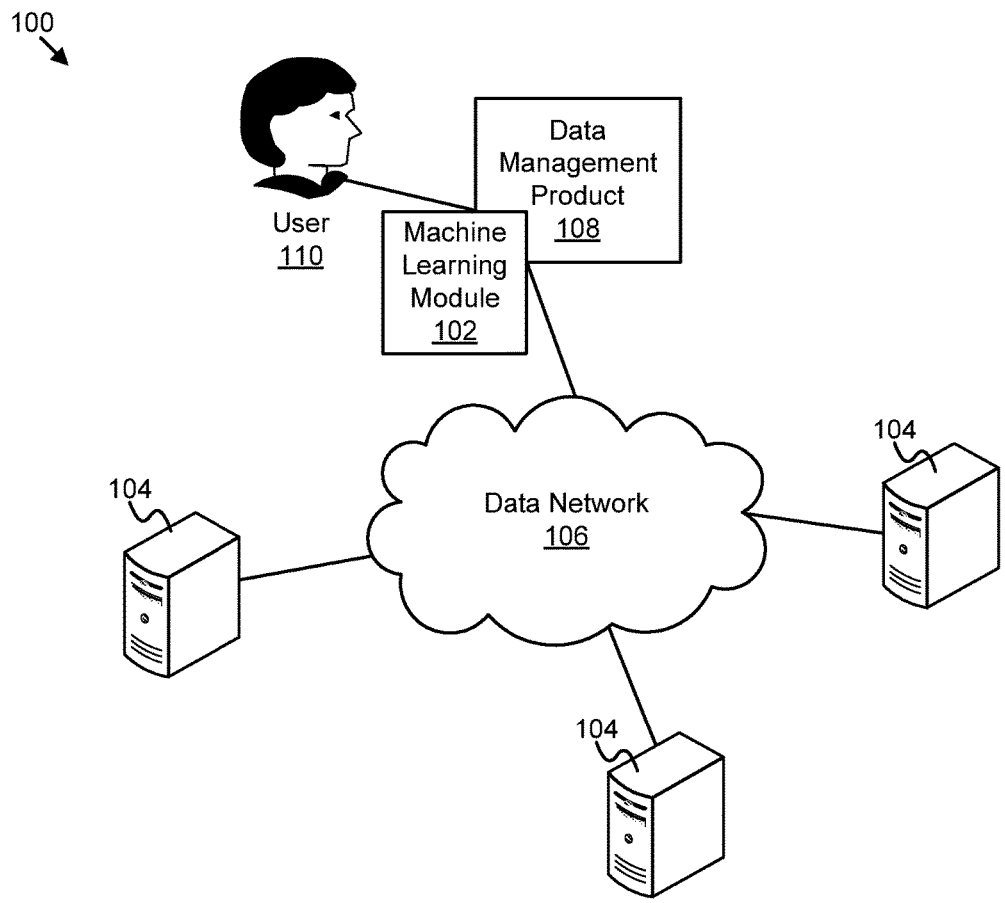
FIG. 1 is a schematic block diagram illustrating one embodiment of a system for integrating machine learning with a data management product.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray Disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Program code for carrying out operations for aspects of the present disclosure may be generated by any combination of one or more programming language types, including, but not limited to any of the following: machine languages, scripted languages, interpretive languages, compiled languages, concurrent languages, list-based languages, object oriented languages, procedural languages, reflective languages, visual languages, or other language types. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1 depicts one embodiment of a system 100 for integrating machine learning with a data management product 108. The system 100, in the depicted embodiment, includes a machine learning module 102 configured to provide machine learning functions, methods, queries, and/or results to a user 110 of the data management product 108 using machine learning. The machine learning module 102, in one embodiment, is integrated with the data management product 108, such as a database system, a spreadsheet program, or the like, as an extension, plug-in, or add-on and may be accessible through a native language or interface of the data management product 108. The machine learning module 102 and/or the data management product 108, in the depicted embodiment, may be in communication with one or more users 110, with one or more clients 104 over a data network 106, or the like.

The data management product 108, in general, comprises software and/or hardware configured to store, provide access to, manipulate, administer, alter, or otherwise manage data for users 110 or other clients 104 of the system 100. The data management product 108, in certain embodiments, may comprise an enterprise database system, a database management system (DBMS), a commercial database product, a spreadsheet product, or the like. The data management product 108 may store, manage, or provide access to data for one or more users 110, for other clients 104, or the like, locally and/or over the data network 106.

Examples of data management products 108, in various embodiments, may include Oracle®, FoxPro®, IBM DB2®, Linter, Microsoft Access®, Microsoft SQL Server, MySQL®, PostgreSQL, SQLite®, or other database management systems. Data management products 108, in a further embodiment, may include a spreadsheet product for organization and/or analysis of data in a tabular, sheet-based format. A data management product 108, in one embodiment, may include a spreadsheet product that is part of a suite, such as Microsoft Office® Excel, LibreOffice® Calc, AppleWorks®, Quattro Pro®, IBM Lotus Notes®, Gnumeric, KSpread, or the like. A data management product 108, in a further embodiment, may include a spreadsheet product that is standalone, such as Mariner Calc, Abykus, Kingsoft®, or the like. A data management product 108, in other embodiments, may include a cloud based or online spreadsheet product such as EditGrid, Sheetster, or the like.

In another embodiment, a data management product 108 may include another type of software application or computer program product designed to provide access to, store, manage, process, manipulate, query, or otherwise access a set of data values, or may simply comprise a set of data values stored on a computer readable storage medium, such as volatile memory, a non-volatile data storage device, or the like. In certain embodiments, an operating system, file system, or other system that manages, accesses, or provides access to data values may comprise a data management product 108.

The machine learning module 102 may be integrated with, co-located with, or otherwise in communication with the data management product 108. For example, the machine learning module 102 may execute on the same host computing device as the data management product 108 and may communicate with the data management product 108 using an API, a function call, a shared library, a configuration file, a hardware bus or other command interface, or using another local channel. In certain embodiments, the machine learning module 102 may be accessed and executed using an extension language or interface of the data management product 108, as an extension, plug-in, add-on or the like for the machine learning module 102. In another embodiment, the machine learning module 102 may be in communication with the data management product 108 over the data network 106, such as a local area network (LAN), a wide area network (WAN) such as the Internet as a cloud service, a wireless network, a wired network, or another data network 106.

The machine learning module 102, in one embodiment, may comprise computer executable code installed on a computing system for extending, modifying, and/or configuring the data management product 108 with machine learning, predictive functionality. In a further embodiment, the machine learning module 102 may comprise a dedicated hardware device or appliance in communication with the data management product 108 over the data network 106, over a communications bus, or the like.

The machine learning module 102, in certain embodiments, interfaces with the data management product 108 to extend functionality of the data management product 108 using machine learning. The machine learning module 102, in one embodiment, uses data of the data management product 108 as machine learning inputs, to generate learned functions and/or machine learning ensembles, to provide predictive machine learning results, or the like based on data of the data management product 108. In one embodiment, the machine learning module 102 may receive data from or within the data management product 108, either directly or indirectly, that the data management product 108 stores, has access to, or the like. In another embodiment, the machine learning module 102 may collect certain data independently from the data management product 108, to supplement data from the data management product 108 or the like with predicted values. In one embodiment, the machine learning module 102 may receive data from a user 110, as configuration data, as a machine learning input, or the like. One example of machine learning that the machine learning module 102 may use to determine a predictive, machine learning result for data of the data management product 108 is a machine learning ensemble as described in greater detail below with regard to FIG. 2B, FIG. 3, FIG. 4, and FIG. 5.

In certain embodiments, the data management product 108 and/or the machine learning module 102 receive an analysis request. Analysis requests may request analysis based on data from the data management product and/or request a prediction of one or more unknown values of the data of the data management product 108. This request may originate from a user, another client 104, a computer system, or an automated request.

In some embodiments, the analysis request is made through a native query language or using a native interface of the data management product 108, such as an SQL query or another database query. This request may be in the form of a command, query, or other form of request. One example of an analysis request is a manual or automatic request to predict the value of one or more unknown values in the data management product 108. More specifically, the analysis request may be a request to predict one or more unknown values that are based on or related to data values stored in the data management product 108. For example, the analysis request may request a prediction of an academic result, a sporting or gaming result, a traffic pattern, a climate result, a chemical result, a linguistics result, a medical result, or the like depending on the type of data and/or the features of data from the data management product 108.

In one embodiment, in response to an analysis request the machine learning module 102 may generate one or more learned function and/or one or more machine learning ensemble that may be used to predict the one more unknown values of data of the data management product 108. In some embodiments, the machine learning module 102 generates the learned functions and/or machine learning ensembles in an automated manner, with little or no further input from a user 110 or the like. For example, in response to an analysis request, the data management product 108 and/or the machine learning module 102 may initiate a new ensemble request that identifies training data, test data, a target feature for a classification or prediction, or the like of the data management product 108. In response to the new ensemble request the machine learning module 102 may use identified data and/or target features as described below with regard to the ensemble factory module 212 of FIGS. 2B, 3, and 4 to generate one or more machine learning ensembles or other learned functions in an automated manner.

The machine learning module 102, in a further embodiment, may satisfy an analysis request or other query from a user 110 or other client 104 by executing the generated one or more machine learning functions and/or machine learning ensembles to predict one or more unknown values. The one or more unknown values may have been identified in the analysis request. The machine learning module 102 may utilize data stored in or accessible to the data management product 108 to predict the one or more unknown values. In this manner, the machine learning module 102, in certain embodiments, may provide predictive, machine learning functionality and results to users 110 or other clients 104 of the data management product 108, without extensive configuration or customization by a data scientist or other expert, using a native interface or language of the data management product 108. This predictive functionality may be beneficial to users of data management products 108, who can, with minimal effort, access one or more predicted values of otherwise unknown data values in the data management product 108. Moreover, as noted below, in some embodiments, the user may also receive a confidence value that relates to the returned predicted values to enable the user to evaluate the probability of the predicted values being correct.

In one embodiment, in response to an analysis request or other query, the data management product 108 may natively execute the one or more learned functions, machine learning ensembles, or other machine learning of the machine learning module 102.

In certain embodiments, the machine learning module 102 may cooperate with the data management product 108 such that the data management product executes an analysis request or other query in parallel, natively within the data management product 108. For example, in one embodiment, the data management product 108 may break, divide, or split a predictive task (e.g., an analysis request or other query) into multiple streams or threads, and may create different instances of the same learned functions, machine learning ensembles, or other machine learning of the machine learning module 102 for each stream or thread such that multiple instances execute at the same time with different data from the data management product 108. The machine learning module 102, in one embodiment, provides learned functions, machine learning ensembles, and/or other machine learning configured to execute in parallel, without interfering with other instances (e.g., updating shared data, overwriting shared data, locking shared data, moving shared data, or the like). Whether or not the data management product 108 executes an analysis request or other query in parallel, in certain embodiments, may be selectable by the user 110 or other client 104, as a setting, a parameter of a query or request, or the like.

Figure 2A:
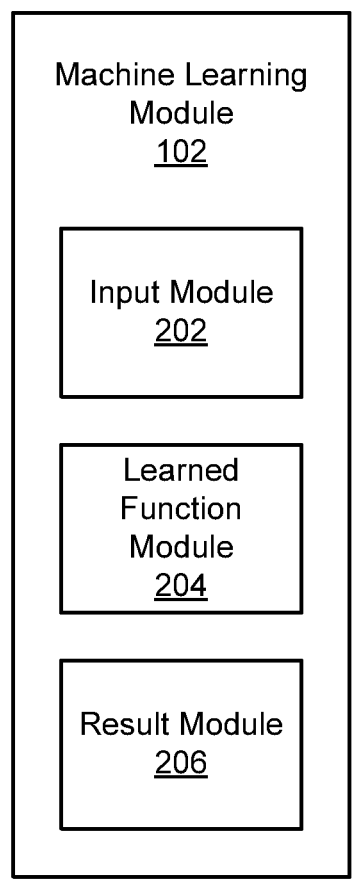
FIG. 2A is a schematic block diagram illustrating one embodiment of a machine learning module.

FIG. 2A depicts one embodiment of a machine learning module 102. The machine learning module 102 of FIG. 2A, in certain embodiments, may be substantially similar to the machine learning module 102 described above with regard to FIG. 1. In the depicted embodiment, the machine learning module 102 includes an input module 202, a learned function module 204, and a result module 206.

In one embodiment, the input module 202 is configured to receive an analysis request for the data management product 108. The analysis request, as previously described, may request analysis on data from the data management product 108 and/or request a prediction of one or more unknown values of the data of the data management product 108. The analysis request may originate from a user, another client 104, a computer system, or automated request In certain embodiments, in response to the analysis request, the input module 202 is configured to request and/or receive data from the data management product 108 as machine learning input for the learned function module 204. The input module 202 may utilize this data to generate machine learning ensembles or other learned functions and/or to provide predictive, machine learning results. For example, the input module 202 may access data from one or more tables, spreadsheets, or other data structures of the data management product 108. The input module 202, in a further embodiment, may receive user information as a machine learning input as described below with regard to the user input module 214 of FIG. 2B. The input module 202 may provide a user interface (e.g., a graphical user interface or GUI, a command-line interface or CLI, a configuration file, or the like) to a user 110 which the user 110 may use to provide user input, may receive input from a user 110 using a native interface of the data management product 108, or the like.

In one embodiment, the input module 202, the learned function module 204, and/or the results module 206 may be integrated with the data management product 108. For example, one or more of these modules may be integrated with the data management product 108 as an extension, plug-in, or add-on within the data management product 108. Accordingly, one or more of these modules may receive data directly from the data management product 108 and provide data directly to and through the data management product 108. For example, one such module may receive data directly using a native interface of the data management product 108, using an API, using a function call, using a shared library, using a hardware bus or other command interface, using a shared data repository, or the like. The input module 202, in another embodiment, may gather or collect certain data itself, from the one or more clients 104 or other computing devices, from a third party data repository over the data network 106, from one or more sensors, or the like, to supplement or complete data from the data management product 108. Additionally, the results module 206 may provide native access to predicted values within the data management product 108, such as through a native interface.

In one embodiment, the learned function module 204 is configured to predict one or more unknown values for the data management product 108. In certain embodiments, to make such prediction, the learned function module 204 is configured to recognize and/or predict patterns, values, features, classifications, query results, or the like in data from the input module 202 (e.g., data from the data management product 108) using machine learning. For example, the learned function module 204 may recognize a pattern in instances of one or more features or column of a database table, spreadsheet, or the like and predict values (e.g., provide a classification) for another feature or column as described in greater detail below with regard to the result module 206. The learned function module 204 may be configured to accept data, user input, a function call, a query in a native language of the data management product 108, or other data from the input module 202 as direct or indirect machine learning inputs and to produce a result in cooperation with the result module 206.

In certain embodiments, the learned function module 204 may be configured to execute one or more machine learning ensembles to predict one or more unknown values for the data management product 108. The machine learning ensemble(s) can be preexisting or can be developed in response to the analysis request. The one or more machine learning ensembles can be configured to recognize and/or predict patterns, values, features, classifications, query results, or the like in data from the input module 202 (e.g., data from the data management product 108) using machine learning. Accordingly, the learned function module 204 can include one or more machine learning ensembles. Machine learning ensembles are described in greater detail below with regard to FIG. 2B, FIG. 3, FIG. 4, and FIG. 5.

The machine learning that the learned function module 204 uses, whether as part of one or more machine learning ensembles or as independent learned functions, in various embodiments, may include decision trees; decision forests; kernel classifiers and regression machines with a plurality of reproducing kernels; non-kernel regression and classification machines such as logistic, classification and regression trees (CART), multi-layer neural nets with various topologies; Bayesian-type classifiers such as Nave Bayes and Boltzmann machines; logistic regression; multinomial logistic regression; probit regression; auto regression (AR); moving average (MA); ARMA; AR conditional heteroskedasticity (ARCH); generalized ARCH (GARCH); vector AR (VAR); survival or duration analysis; multivariate adaptive regression splines (MARS); radial basis functions; support vector machines; k-nearest neighbors; geospatial predictive modeling; and/or other classes of machine learning.

A learned function (or machine learning ensemble) of the learned function module 204 may accept instance of one or more features (of data from the data management product 108) as input, and provide a prediction, a classification, a confidence metric, an inferred function, a regression function, an answer, a subset of the instances, a subset of the one or more features, or the like as an output or result. In certain embodiments, a learned function or machine learning ensemble of the learned function module 204 may not be configured to output a desired result directly, and a translation module 326, as described below with regard to FIG. 3, may translate the output of a learned function or machine learning ensemble into the desired result, with a desired format, or the like.

By using machine learning, such as a machine learning ensemble or set of machine learning ensembles, in one embodiment, the learned function module 204 may recognize complex patterns in data of the data management product 108. The learned function module 204 may use the complex recognized patterns to intelligently determine predictive, machine learning which may also be complex. The patterns and associated results determined by the learned function module 204, in certain embodiments, may be unexpected and difficult or impossible for a user 110 to detect on their own, and may not be available using the default, built-in functions or methods of the data management product 108. The learned function module 204 may cooperate with the ensemble factory module 212 to create machine learning ensembles 222 in an automated manner that are customized for particular data, for a particular data management product 108, or the like, as described below.

The results module 206 can be configured to provide native access, within the data management product 108, to the predicted values determined by the learned function module 204. For example, the result module 206, in one embodiment, may provide a predictive, machine learning result from the learned function module 204 that the learned function module 204 processes. The result module 206 may be integrated with the learned function module 204, in communication with the learned function module 204, or may otherwise cooperate with the learned function module 204 to provide results.

Native access may be provided through the native interface of the data management product 108, through a pop-up window thereof, or through any other native aspect of the data management product. For example, the results module 206 can input one or more predicted values into the data management product 108, which may be viewed by a user through the native interface of the data management product 108. In a more specific example, the results module 206 can be configured to populate a column/row of a table represented in a native interface of the data management product 108 with predicted values.

In some embodiments, the results module 206 is configured to modify a data structure of the data management product 108 to store the one or more predicted values provided by the results module 206. Data structures may be modified, replaced, or edited with data of the predicted values. Additionally, one or more new data features or types may be added to accommodate the predicted values. For instance, the result module 206 can add and column/row to a table, create a new data type and data values of that type, modify data values, edit data values, and the like.

As mentioned, in some embodiments, the learned function module 204 is configured to determine a confidence value corresponding to each predicted value. A confidence value can identify the likelihood that the predicted value will be correct. For example, the learned function module 204 may identify multiple predicted values for an unknown value of the data management product 108. The learned function module 204 may further calculate a confidence value (or metric) for each of the multiple predicted values. The confidence value may be a percentage, ranking, score, or other suitable representation. In some embodiments, the results module 206 is configured to provide native access, within the data management product, to a confidence value corresponding to each of the predicted values. In some embodiments, the results module 206 may be configured to filter out predicted values that have a confidence value below a threshold amount. Thus, in some instances, the results module 206 may only provide predicted values and their corresponding confidence values when the confidence value exceeds the threshold. Additionally or alternatively, the results module 206 may be configured to provide to the data management product 108 only the predicted values (e.g., the one, two, three, or four predicted values) having the highest confidence value(s).

In one embodiment, the input module 202 may receive data from the data management product 108 for developing, training, and/or testing machine learning with little or no user input in the selection and generation of the machine learning functions. The machine learning module 102, in certain embodiments, may use machine learning, such as a generated machine learning ensemble or other learned functions, to supplement, extend, and/or enhance the data management product 108, using an existing or native interface of the data management product 108. The input module 202 may provide one or more supplemental, enhanced, and/or extended functions or methods to users 110 or other clients 104 using the existing or native interface of the data management product 108.

As described above, the machine learning module 102 may provide extended or enhanced functions to a data management product 108. In certain embodiments, these functions may be accessed in a structured query language (SQL) query or other type of native query of the data management product 108, in a GUI of the data management product 108, or using another native interface. For example, without an appropriate extension or enhancement, a query may be limited to requesting data already stored in or accessible to the data management product 108. In a specific implementation, a data management product 108 may store student's test scores and other associated class-related data. The data management product 108 may permit a user to search the class-related data, as follows: SELECT mid_term_score FROM scores WHERE studentID=456. However, absent the machine learning module 102, the data management product 108 may be severely or completely limited in its ability to analyze or predict data values that are not stored in the data management product 108. In certain embodiments, the machine learning module 102 may extend the data management product 108 with one or more predictive, machine learning functions. In the academic example above, instead of simply providing access to existing scores or other data, the input module 202 may provide access to a grade predictor function, such as predict_final_grade (grade) and other suitable predicting functions.

In response to a user 110 or other client 104 submitting an analysis request or other query to the input module 202, the learned function module 204 may process or analyze data associated with the analysis request in the data management system 108 using machine learning. The result module 206 may subsequently provide a result from the learned function module 204 to the requesting user 110 or other client 104. The example grade predictor function may return a predicted grade, a confidence metric, and/or another predictive, machine learning result based, at least in part, on the mid_term_score data previously discussed, on other data values associated with the student in the data management system 108 such as, homework scores, test scores, quiz scores, attendance, associations with various student groups, residence, location in a classroom, student age, school age, teacher age, teacher gender, student gender, or the like, as determined by the learned function module 204.

In the academic example, a query or analysis request such as "SELECT predict_final_grade ('A') WHERE studentID=456;" may return a confidence metric associated with the likelihood that the identified student will receive a final grade of 'A' (e.g., a confidence metric of 92% if the student received a high mid-term grade, has good attendance, or the like; a confidence metric of 22% if the student received a low mid-term grade, has low attendance, or the like). In another embodiment, the input module 202 may provide support for a query or another analysis request that involves the results of several different learned functions, machine learning ensembles, or the like. In the previous academic example, the input module 202 may support a query that requests a prediction of the most likely grade a student may receive.

In the example, in one embodiment, the learned function module 204 may execute the query using a machine learning ensemble or other machine learning for each available grade value, providing confidence metrics for each available grade value, such as an A+, A, A−, B+, B, B−, C+, C, C−, D+, D, D−, F, P (Passing), O (Outstanding), E (Exceeding Expectations), M (Meeting, Expectations), S (Satisfactory), U (Unsatisfactory), or the like. The result module 206, in certain embodiments, may return the grade value with the highest confidence value, or the like, out of each possible grade value. For example, if available grade values for a given student are A, B, C, D, or F, and respective confidence value from the learned function module 204 are A=43%, B=72%, C=38%, D=21%, F=8%, the result module 206 may return a predicted grade of B. Additionally, in some embodiments, the results module 206 may provide the confidence value of 72% corresponding to the predicted B grade.

In certain embodiments, the learned function module 204 may transform data values from the data management system 108 for compatibility with machine learning, such as a machine learning ensemble, for consistency of results, for accuracy, for simplicity, for efficiency, or the like. For example, a zip code may be converted into latitude and longitude values, dates may be transformed into real values or offsets, strings may be transformed into flags or identifiers (e.g., a different binary value may represent each value of a string, for example a binary zero for a male gender and a binary one for a female gender in a database table or spreadsheet), or the like. In one embodiment, the learned function module 204 may translate data from a human-readable or human language format into a predictive ready or machine-readable format, or the like.

Additionally, the learned function module 204 may scale or alter data values for inclusion in a machine learning data set (e.g., training data, test data, workload data). For example, a learned function may approximate a physical object as a cube. In this example, it may be more convenient to represent the physical object by a set of three values representing a height, width, and depth, thereby describing physical dimensions of the item as a cube. This may allow a wide variety of physical objects in different shapes to be used as input into a learned function that represents a physical object as a cube. The learned function module 204 may provide other representations or alterations of data in the data management product 108 for convenience, consistency, simplicity, reliability, accuracy, or the like.

A user 110 or other client 104, in certain embodiments, may access the provided functions or methods of the learned function module 204 as native language commands of the data management product 108, using a native interface of the data management product 108, or the like. Therefore, a user 110 or other client 104, in certain embodiments, may generate machine learning functions or methods (e.g., a machine learning ensemble or other learned function) and/or access predictive, machine learning functions or methods via the input module 202 using existing skills or knowledge of the native language or interface of the data management product 108, with little or no additional training.

In one embodiment, a data management product 108 for vehicular or pedestrian traffic may be extended or enhanced by the machine learning module 102 with a predictive method called "predict_travel_time." In this example, this method may predict an estimated travel time from "start_location" to "end_location" at a specified time based on data from the input module 202 processed by the learned function module 204. In the example, the learned function module 204 may use machine learning to predict a result based on a variety of data from the data management product 108, such as historical traffic patterns, weather conditions, temperature and other climate conditions, road construction conditions, traffic accidents or other events that may block traffic, emergency situations, security considerations, sporting events or other events that may affect traffic, day of the week, holidays, time of day, market conditions, scheduled events, parking facilities, road sizes, construction, or the like.

In one embodiment, the learned function module 204 may regenerate (e.g., retrain or relearn) a particular predictive method or function (e.g., a machine learning ensemble, a learned function, or the like) in response to a trigger event. Non-limiting examples of triggering events include a change in data stored in the data management product 108, an update request from a user 110 or other client 104, an amount of time passing (e.g., periodically), or the like. For example, the learned function module 204 may retrain or relearn the predict_travel_time predictive methods or functions in the traffic example when a condition changes, such as a change in a weather pattern, a change in construction, a change in an available lane of traffic, or the like. In other embodiments, a predictive method or function generated by the learned function module 204, using the ensemble factory module 212 or the like, may be configured to provide a result based on a change in one or more features or conditions without retraining or relearning.

In addition to the academic and traffic examples described above, in various embodiments, the machine learning module 102 may provide predictive, machine learning functions or methods for employment predictions based on qualifications, achievements, or the like; salary or compensation bonus predictions based on work history, skills, or the like; agricultural predictions such as hydration for a field of crops based on the type of crop being grown, rain or rain patterns, natural water flow, dew and sprinkler time, chemical treatments, sunlight, or the like; or other predictions based on the type of data stored in or accessible by the data management product 108.

The learned function module 204, in various embodiments, may generate and/or execute learned functions, machine learning ensembles (as described below with regard to the ensemble factory module 212), or the like using different types of computing resources, such as a super computer, a computing cluster, a cloud computing service, one or more central processing units (CPUs), one or more graphic processing units (GPUs), or the like.

The machine learning module 102 may use a data definition language (DDL) or another language or interface supported by the data management product 108 to define data structure or database schemas to facilitate learning for predictive methods. For example, in response to the learned function module 204 providing enhanced methods or functions, the learned function module 204 may use a DDL to modify or enhance a default language or set of supported methods or functions for the data management product 108 in order to integrate the learned methods or functions into the data management product 108.

As mentioned, in one embodiment, the result module 206 may modify a table or other data structure of the data management product 108 to store predictive results. For example, in an academic scenario, the result module 206 may add one or more columns to a grades table for storing results (e.g., a predicted grade value, a confidence metric for a grade value, or the like). In certain embodiments, the results that the result module 206 stores in data structures of the data management product 108 may be accessible to a user 110 or other client 104 through the data management system 108 with the rest of the data in the data structures, using a supported interface. One skilled in the art, in light of this disclosure, will recognize a wide variety of ways in which a predictive method or function may be integrated into a query or other native interface of a data management product 108. For example, in a select statement, the select may be based on a single table, multiple joined tables, or the like, and may reference one or more predictive methods and/or functions.

Figure 2B:
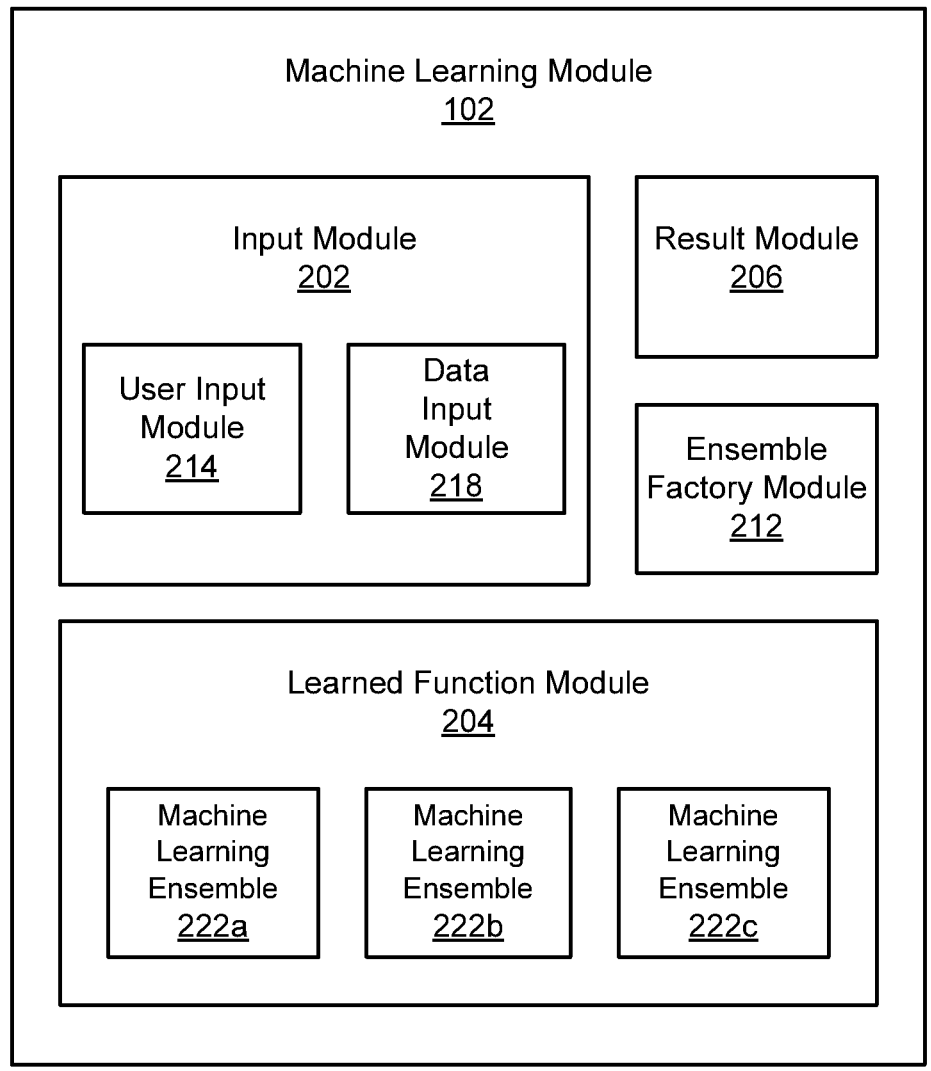
FIG. 2B is a schematic block diagram illustrating another embodiment of a machine learning module.

FIG. 2B depicts another embodiment of a machine learning module 102. In certain embodiments, the machine learning module 102 of FIG. 2B may be substantially similar to the machine learning module 102 described above with regard to FIG. 1 and/or FIG. 2A. In the depicted embodiment, the machine learning module 102 includes the input module 202, the learned function module 204, and the result module 206 and further includes an ensemble factory module 212. The input module 202, in the depicted embodiment, includes a user input module 214, and a data input module 218. The learned function module 204, in the depicted embodiment, includes one or more machine learning ensembles 222a-c.

The input module 202, in certain embodiments, may include a user input module 214 to receive input from a user 110. For example, a user may enter information via an input device of a computing device of the data management product 108, an input device of a client 104, such as a keyboard, mouse, touchpad, or the like. The user input module 214, in one embodiment, may receive user information dynamically during runtime of the data management product 108, so that the learned function module 204 may respond to or make determinations based on the user information. The user input module 214 may also receive an analysis request or data relating to an analysis request.

In certain embodiments, the input module 202 uses a data input module 218 to receive data for developing and/or training learned functions. The data input module 218 may receive data from a data management product 108, may gather systems management data itself, or the like. The input module 202, in certain embodiments, may use the data input module 218 to receive data for the learned function module 204 to use as training data, testing data, and/or workload data. The data input module 218 may receive data directly from the data management product 108, and/or may gather certain data itself. The data input module 218, in certain embodiments, may dynamically monitor or collect data over time, so that as patterns in the data change, the machine learning module 102 may dynamically provide or update results.

In one embodiment, the ensemble factory module 212 is configured to form one or more machine learning ensembles 222a-c for the learned function module 204. In certain embodiments, the learned function module 204 may include a plurality of machine learning ensembles 222a-c. Each one of the plurality of machine learning ensembles 222a-c may be configured for use with different data sets of the data management product 108, for different data management products 108, for different queries, for different types of methods and/or functions, or the like.

The ensemble factory module 212, in certain embodiments, generates machine learning ensembles 222a-c by generating a large number of learned functions from multiple different classes, evaluating, combining, and/or extending the learned functions, synthesizing selected learned functions, and organizing the synthesized learned functions into a machine learning ensemble 222. Thus, in some embodiments, the ensemble factory module 212 may require little or no input from a Data Scientist or other human contributor. The ensemble factory module 212, in one embodiment, services analysis requests with input from the input module 202 and the one or more machine learning ensembles 222a-c. The ensemble factory module 212 may produce one or more machine learning ensembles 222a-c that may perform analysis, calculate results, and/or recognize patterns for the result module 206. While the learned function module 204, in the depicted embodiment, includes three machine learning ensembles 222a-c, in other embodiments, the learned function module 204 may include one or more single learned functions not organized into a machine learning ensemble 222; a single machine learning ensemble 222; tens, hundreds, or thousands of machine learning ensembles 222; or the like.

In some embodiments, the ensemble factory module 212 is configured to generate the one or more machine learning ensembles using training data from the data management product 108. Training data may include data from data types related to the analysis request that may be used to generate learned functions and machine learning ensembles. Training data may specifically include data relating to known values, such as historical values, that can be utilized to develop learned functions and machine learning ensembles for predicting unknown values. The generated machine learning ensembles may subsequently be configured to predict the one or more unknown values in the data management product 108 using workload data from the data management product 108. Workload data can include actual data that is likely to be relevant to the prediction of one or more unknown values associated with the analysis request. These processes will be described in greater detail below.

By generating a large number of learned functions, without regard to the effectiveness of the generated learned functions, without prior knowledge of the generated learned functions suitability, or the like, and evaluating the generated learned functions, in certain embodiments, the ensemble factory module 212 may provide machine learning ensembles 222a-c that are customized and finely tuned for a particular set of data of a data management product 108, without excessive intervention or fine-tuning. The ensemble factory module 212, in a further embodiment, may generate and evaluate a large number of learned functions using parallel computing on multiple processors, such as a massively parallel processing (MPP) system or the like. Machine learning ensembles 222 are described in greater detail below with regard to FIG. 3, FIG. 4, and FIG. 5.

Figure 3:
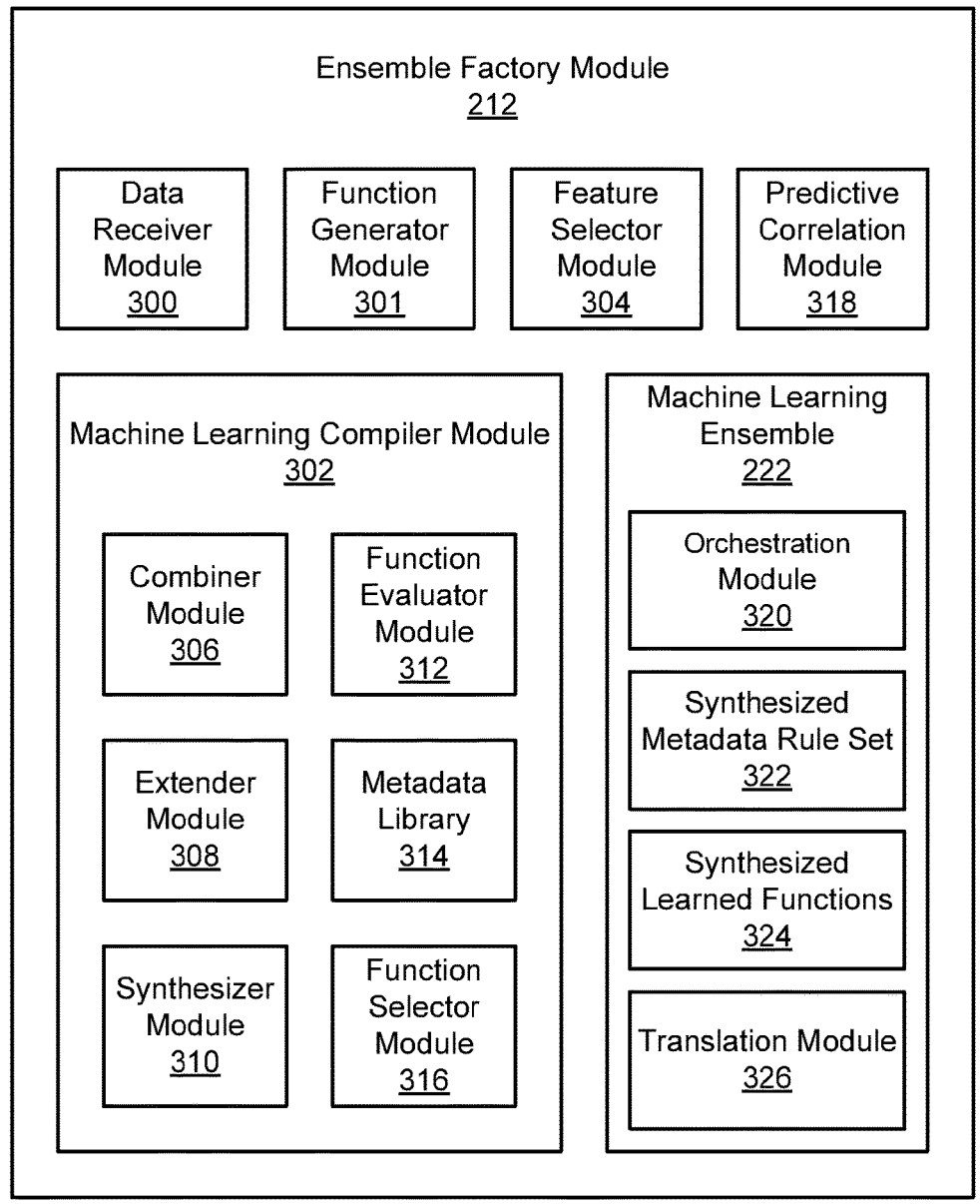
FIG. 3 is a schematic block diagram illustrating one embodiment of an ensemble factory module.

FIG. 3 depicts another embodiment of an ensemble factory module 212. The ensemble factory module 212 of FIG. 3, in certain embodiments, may be substantially similar to the ensemble factory module 212 described above with regard to FIG. 2B. In the depicted embodiment, the ensemble factory module 212 includes a data receiver module 300, a function generator module 301, a machine learning compiler module 302, a feature selector module 304 a predictive correlation module 318, and a machine learning ensemble 222. The machine learning compiler module 302, in the depicted embodiment, includes a combiner module 306, an extender module 308, a synthesizer module 310, a function evaluator module 312, a metadata library 314, and a function selector module 316. The machine learning ensemble 222, in the depicted embodiment, includes an orchestration module 320, a synthesized metadata rule set 322, synthesized learned functions 324, and a translation module 326.

The data receiver module 300, in certain embodiments, is configured to receive input data, such as training data, test data, workload data, data management product 108 data, user input data, or the like, from the learned function module 204, the input module 202, or a client, either directly or indirectly. The data receiver module 300, in various embodiments, may receive data over a local channel 108 such as an API, a shared library, a hardware command interface, or the like; over a data network 106 such as wired or wireless LAN, WAN, the Internet, a serial connection, a parallel connection, or the like. In certain embodiments, the data receiver module 300 may receive data indirectly from the learned function module 204 or another client through an intermediate module that may pre-process, reformat, or otherwise prepare the data for the ensemble factory module 212. The data receiver module 300 may support structured data, unstructured data, semi-structured data, or the like.

One type of data that the data receiver module 300 may receive, as part of a new ensemble request or the like, is initialization data. The ensemble factory module 212, in certain embodiments, may use initialization data to train and test learned functions from which the ensemble factory module 212 may build a machine learning ensemble 222. Initialization data may comprise data already stored in or accessible to the data management product 108, or may be from other sources, such as, a file on a non-volatile storage medium, or the like. Additionally, initialization data may comprise user input data, or other data that the learned function module 204, the input module 202, or another client provides to the data receiver module 300 with which to build, initialize, train, and/or test a machine learning ensemble 222.

Another type of data that the data receiver module 300 may receive, as part of an analysis request or the like, is workload data (e.g., data with which the learned function module 204 is to predict a result). As described above, the input module 202, either in cooperation with the data management product 108 or independently, may receive or access data from the data management product 108, and each column, data type, data label, or the like that the input module 202 receives may comprise a different feature. The input module 202 and/or the learned function module 204, in certain embodiments, may provide instances of received or accessed data to the data receiver module 300.

The ensemble factory module 212, in certain embodiments, may process workload data using a machine learning ensemble 222 to obtain a result, such as a prediction, a classification, a confidence metric, an answer, a recognized pattern, a rule, a threshold, a setting, a recommendation, or the like. Workload data for a specific machine learning ensemble 222, in one embodiment, has substantially the same format as the initialization data used to train and/or evaluate the machine learning ensemble 222. For example, initialization data and/or workload data may include one or more features. As used herein, a feature may comprise a column, category, data type, attribute, characteristic, label, or other grouping of data. For example, in embodiments where initialization data and/or workload data that is organized in a table format, a column of data may be a feature. Initialization data and/or workload data may include one or more instances of the associated features. In a table format, where columns of data are associated with features, a row of data is an instance.

As described below with regard to FIG. 4, in one embodiment, the data receiver module 300 may maintain client data, such as initialization data and/or workload data, in a data repository 406, where the function generator module 301, the machine learning compiler module 302, or the like may access the data. The data repository 406, in one embodiment, may be part of or integrated with the data management product 108. In certain embodiments, as described below, the function generator module 301 and/or the machine learning compiler module 302 may divide initialization data into subsets, using certain subsets of data as training data for generating and training learned functions and using certain subsets of data as test data for evaluating generated learned functions.

The function generator module 301, in certain embodiments, is configured to generate a plurality of learned functions based on training data from the data receiver module 300. A learned function, as used herein, comprises a computer readable code that accepts an input and provides a result. A learned function may comprise a compiled code, a script, text, a data structure, a file, a function, or the like. In certain embodiments, a learned function may accept instances of one or more features as input, and provide a result, such as a prediction, a classification, a confidence metric, an inferred function, a regression function, an answer, a recognized pattern, a rule, a threshold, a setting, a recommendation, or the like. In another embodiment, certain learned functions may accept instances of one or more features as input, and provide a subset of the instances, a subset of the one or more features, or the like as an output. In a further embodiment, certain learned functions may receive the output or result of one or more other learned functions as input, such as a Bayes classifier, a Boltzmann machine, or the like.

The function generator module 301 may generate learned functions from multiple different machine learning classes, models, or algorithms. For example, the function generator module 301 may generate decision trees; decision forests; kernel classifiers and regression machines with a plurality of reproducing kernels; non-kernel regression and classification machines such as logistic, CART, multi-layer neural nets with various topologies; Bayesian-type classifiers such as Nave Bayes and Boltzmann machines; logistic regression; multinomial logistic regression; probit regression; AR; MA; ARMA; ARCH; GARCH; VAR; survival or duration analysis; MARS; radial basis functions; support vector machines; k-nearest neighbors; geospatial predictive modeling; and/or other classes of learned functions.

In one embodiment, the function generator module 301 generates learned functions pseudo-randomly, without regard to the effectiveness of the generated learned functions, without prior knowledge regarding the suitability of the generated learned functions for the associated training data, or the like. For example, the function generator module 301 may generate a total number of learned functions that is large enough that at least a subset of the generated learned functions are statistically likely to be effective. As used herein, pseudo-randomly indicates that the function generator module 301 is configured to generate learned functions in an automated manner, without input or selection of learned functions, machine learning classes or models for the learned functions, or the like by a Data Scientist, expert, or other user.

The function generator module 301, in certain embodiments, generates as many learned functions as possible for a requested machine learning ensemble 222, given one or more parameters or limitations. The learned function module 204 or another client may provide a parameter or limitation for learned function generation as part of a new ensemble request or the like to an interface module 402 as described below with regard to FIG. 4, such as an amount of time; an allocation of system resources such as a number of processor nodes or cores, or an amount of volatile memory; a number of learned functions; runtime constraints on the requested ensemble such as an indicator of whether or not the requested ensemble should provide results in real-time; and/or another parameter or limitation from the learned function module 204 or another client.

The number of learned functions that the function generator module 301 may generate for building a machine learning ensemble 222 may also be limited by capabilities of the system 100, such as a number of available processors or processor cores, a current load on the system 100, a price of remote processing resources over the data network 106; or other hardware capabilities of the system 100 available to the function generator module 301. The function generator module 301 may balance the hardware capabilities of the system 100 with an amount of time available for generating learned functions and building a machine learning ensemble 222 to determine how many learned functions to generate for the machine learning ensemble 222.

In one embodiment, the function generator module 301 may generate at least 50 learned functions for a machine learning ensemble 222. In a further embodiment, the function generator module 301 may generate hundreds, thousands, or millions of learned functions, or more, for a machine learning ensemble 222. By generating an unusually large number of learned functions from different classes without regard to the suitability or effectiveness of the generated learned functions for training data, in certain embodiments, the function generator module 301 ensures that at least a subset of the generated learned functions, either individually or in combination, are useful, suitable, and/or effective for the training data without careful curation and fine tuning by a Data Scientist or other expert.

Similarly, by generating learned functions from different machine learning classes without regard to the effectiveness or the suitability of the different machine learning classes for training data, the function generator module 301, in certain embodiments, may generate learned functions that are useful, suitable, and/or effective for the training data due to the sheer amount of learned functions generated from the different machine learning classes. This brute force, trial-and-error approach to generating learned functions, in certain embodiments, eliminates or minimizes the role of a Data Scientist or other expert in generation of a machine learning ensemble 222.

The function generator module 301, in certain embodiments, divides initialization data from the data receiver module 300 into various subsets of training data, and may use different training data subsets, different combinations of multiple training data subsets, or the like to generate different learned functions. The function generator module 301 may divide the initialization data into training data subsets by feature, by instance, or both. For example, a training data subset may comprise a subset of features of initialization data, a subset of features of initialization data, a subset of both features and instances of initialization data, or the like. Varying the features and/or instances used to train different learned functions, in certain embodiments, may further increase the likelihood that at least a subset of the generated learned functions are useful, suitable, and/or effective. In a further embodiment, the function generator module 301 ensures that the available initialization data is not used in its entirety as training data for any one learned function, so that at least a portion of the initialization data is available for each learned function as test data, which is described in greater detail below with regard to the function evaluator module 312 of FIG. 3.

In one embodiment, the function generator module 301 may also generate additional learned functions in cooperation with the machine learning compiler module 302. The function generator module 301 may provide a learned function request interface, allowing the machine learning compiler module 302, the learned function module 204, another module, another client, or the like to send a learned function request to the function generator module 301 requesting that the function generator module 301 generate one or more additional learned functions. In one embodiment, a learned function request may include one or more attributes for the requested one or more learned functions. For example, a learned function request, in various embodiments, may include a machine learning class for a requested learned function, one or more features for a requested learned function, instances from initialization data to use as training data for a requested learned function, runtime constraints on a requested learned function, or the like. In another embodiment, a learned function request may identify initialization data, training data, or the like for one or more requested learned functions and the function generator module 301 may generate the one or more learned functions pseudo-randomly, as described above, based on the identified data.

The machine learning compiler module 302, in one embodiment, is configured to form a machine learning ensemble 222 using learned functions from the function generator module 301. As used herein, a machine learning ensemble 222 comprises an organized set of a plurality of learned functions. Providing a classification, a confidence metric, an inferred function, a regression function, an answer, a recognized pattern, a rule, a threshold, a setting, a recommendation, or another result using a machine learning ensemble 222, in certain embodiments, may be more accurate than using a single learned function.

The machine learning compiler module 302 is described in greater detail below with regard to FIG. 3. The machine learning compiler module 302, in certain embodiments, may combine and/or extend learned functions to form new learned functions, may request additional learned functions from the function generator module 301, or the like for inclusion in a machine learning ensemble 222. In one embodiment, the machine learning compiler module 302 evaluates learned functions from the function generator module 301 using test data to generate evaluation metadata. The machine learning compiler module 302, in a further embodiment, may evaluate combined learned functions, extended learned functions, combined-extended learned functions, additional learned functions, or the like using test data to generate evaluation metadata.

The machine learning compiler module 302, in certain embodiments, maintains evaluation metadata in a metadata library 314, as described below with regard to FIGS. 3 and 4. The machine learning compiler module 302 may select learned functions (e.g. learned functions from the function generator module 301, combined learned functions, extended learned functions, learned functions from different machine learning classes, and/or combined-extended learned functions) for inclusion in a machine learning ensemble 222 based on the evaluation metadata. In a further embodiment, the machine learning compiler module 302 may synthesize the selected learned functions into a final, synthesized function or function set for a machine learning ensemble 222 based on evaluation metadata. The machine learning compiler module 302, in another embodiment, may include synthesized evaluation metadata in a machine learning ensemble 222 for directing data through the machine learning ensemble 222 or the like.

In one embodiment, the feature selector module 304 determines which features of initialization data to use in the machine learning ensemble 222, and in the associated learned functions, and/or which features of the initialization data to exclude from the machine learning ensemble 222, and from the associated learned functions. As described above, initialization data, and the training data and testing data derived from the initialization data, may include one or more features. Learned functions and the machine learning ensembles 222 that they form are configured to receive and process instances of one or more features. Certain features may be more predictive than others, and the more features that the machine learning compiler module 302 processes and includes in the generated machine learning ensemble 222, the more processing overhead used by the machine learning compiler module 302, and the more complex the generated machine learning ensemble 222 becomes. Additionally, certain features may not contribute to the effectiveness or accuracy of the results from a machine learning ensemble 222, but may simply add noise to the results.

The feature selector module 304, in one embodiment, cooperates with the function generator module 301 and the machine learning compiler module 302 to evaluate the effectiveness of various features, based on evaluation metadata from the metadata library 314 described below. For example, the function generator module 301 may generate a plurality of learned functions for various combinations of features, and the machine learning compiler module 302 may evaluate the learned functions and generate evaluation metadata. Based on the evaluation metadata, the feature selector module 304 may select a subset of features that are most accurate or effective, and the machine learning compiler module 302 may use learned functions that utilize the selected features to build the machine learning ensemble 222. The feature selector module 304 may select features for use in the machine learning ensemble 222 based on evaluation metadata for learned functions from the function generator module 301, combined learned functions from the combiner module 306, extended learned functions from the extender module 308, combined extended functions, synthesized learned functions from the synthesizer module 310, or the like.

In a further embodiment, the feature selector module 304 may cooperate with the machine learning compiler module 302 to build a plurality of different machine learning ensembles 222 for the same initialization data or training data, each different machine learning ensemble 222 utilizing different features of the initialization data or training data. The machine learning compiler module 302 may evaluate each different machine learning ensemble 222, using the function evaluator module 312 described below, and the feature selector module 304 may select the machine learning ensemble 222 and the associated features which are most accurate or effective based on the evaluation metadata for the different machine learning ensembles 222. In certain embodiments, the machine learning compiler module 302 may generate tens, hundreds, thousands, millions, or more different machine learning ensembles 222 so that the feature selector module 304 may select an optimal set of features (e.g. the most accurate, most effective, or the like) with little or no input from a Data Scientist, expert, or other user in the selection process.

In one embodiment, the machine learning compiler module 302 may generate a machine learning ensemble 222 for each possible combination of features from which the feature selector module 304 may select. In a further embodiment, the machine learning compiler module 302 may begin generating machine learning ensembles 222 with a minimal number of features, and may iteratively increase the number of features used to generate machine learning ensembles 222 until an increase in effectiveness or usefulness of the results of the generated machine learning ensembles 222 fails to satisfy a feature effectiveness threshold. By increasing the number of features until the increases stop being effective, in certain embodiments, the machine learning compiler module 302 may determine a minimum effective set of features for use in a machine learning ensemble 222, so that generation and use of the machine learning ensemble 222 is both effective and efficient. The feature effectiveness threshold may be predetermined or hard coded, may be selected by the learned function module 204 or another client as part of a new ensemble request or the like, may be based on one or more parameters or limitations, or the like.

During the iterative process, in certain embodiments, once the feature selector module 304 determines that a feature is merely introducing noise, the machine learning compiler module 302 excludes the feature from future iterations, and from the machine learning ensemble 222. In one embodiment, the learned function module 204 or another client may identify one or more features as required for the machine learning ensemble 222, in a new ensemble request or the like. The feature selector module 304 may include the required features in the machine learning ensemble 222, and select one or more of the remaining optional features for inclusion in the machine learning ensemble 222 with the required features.

In a further embodiment, based on evaluation metadata from the metadata library 314, the feature selector module 304 determines which features from initialization data and/or training data are adding noise, are not predictive, are the least effective, or the like, and excludes the features from the machine learning ensemble 222. In other embodiments, the feature selector module 304 may determine which features enhance the quality of results, increase effectiveness, or the like, and selects the features for the machine learning ensemble 222.

In one embodiment, the feature selector module 304 causes the machine learning compiler module 302 to repeat generating, combining, extending, and/or evaluating learned functions while iterating through permutations of feature sets. At each iteration, the function evaluator module 312 may determine an overall effectiveness of the learned functions in aggregate for the current iteration's selected combination of features. Once the feature selector module 304 identifies a feature as noise introducing, the feature selector module may exclude the noisy feature and the machine learning compiler module 302 may generate a machine learning ensemble 222 without the excluded feature. In one embodiment, the predictive correlation module 318 determines one or more features, instances of features, or the like that correlate with higher confidence metrics (e.g. that are most effective in predicting results with high confidence). The predictive correlation module 318 may cooperate with, be integrated with, or otherwise work in concert with the feature selector module 304 to determine one or more features, instances of features, or the like that correlate with higher confidence metrics. For example, as the feature selector module 304 causes the machine learning compiler module 302 to generate and evaluate learned functions with different sets of features, the predictive correlation module 318 may determine which features and/or instances of features correlate with higher confidence metrics, are most effective, or the like based on metadata from the metadata library 314.

The predictive correlation module 318, in certain embodiments, is configured to harvest metadata regarding which features correlate to higher confidence metrics, to determine which feature was predictive of which outcome or result, or the like. In one embodiment, the predictive correlation module 318 determines the relationship of a feature's predictive qualities for a specific outcome or result based on each instance of a particular feature. In other embodiments, the predictive correlation module 318 may determine the relationship of a feature's predictive qualities based on a subset of instances of a particular feature. For example, the predictive correlation module 318 may discover a correlation between one or more features and the confidence metric of a predicted result by attempting different combinations of features and subsets of instances within an individual feature's dataset, and measuring an overall impact on predictive quality, accuracy, confidence, or the like. The predictive correlation module 318 may determine predictive features at various granularities, such as per feature, per subset of features, per instance, or the like.

In one embodiment, the predictive correlation module 318 determines one or more features with a greatest contribution to a predicted result or confidence metric as the machine learning compiler module 302 forms the machine learning ensemble 222, based on evaluation metadata from the metadata library 314, or the like. For example, the machine learning compiler module 302 may build one or more synthesized learned functions 324 that are configured to provide one or more features with a greatest contribution as part of a result. In another embodiment, the predictive correlation module 318 may determine one or more features with a greatest contribution to a predicted result or confidence metric dynamically at runtime as the machine learning ensemble 222 determines the predicted result or confidence metric. In such embodiments, the predictive correlation module 318 may be part of, integrated with, or in communication with the machine learning ensemble 222. The predictive correlation module 318 may cooperate with the machine learning ensemble 222, such that the machine learning ensemble 222 provides a listing of one or more features that provided a greatest contribution to a predicted result or confidence metric as part of a response to an analysis request.

In determining features that are predictive, or that have a greatest contribution to a predicted result or confidence metric, the predictive correlation module 318 may balance a frequency of the contribution of a feature and/or an impact of the contribution of the feature. For example, a certain feature or set of features may contribute to the predicted result or confidence metric frequently, for each instance or the like, but have a low impact. Another feature or set of features may contribute relatively infrequently, but has a very high impact on the predicted result or confidence metric (e.g. provides at or near 100% confidence or the like). While the predictive correlation module 318 is described herein as determining features that are predictive or that have a greatest contribution, in other embodiments, the predictive correlation module 318 may determine one or more specific instances of a feature that are predictive, have a greatest contribution to a predicted result or confidence metric, or the like.

In the depicted embodiment, the machine learning compiler module 302 includes a combiner module 306. The combiner module 306 combines learned functions, forming sets, strings, groups, trees, or clusters of combined learned functions. In certain embodiments, the combiner module 306 combines learned functions into a prescribed order, and different orders of learned functions may have different inputs, produce different results, or the like. The combiner module 306 may combine learned functions in different combinations. For example, the combiner module 306 may combine certain learned functions horizontally or in parallel, joined at the inputs and at the outputs or the like, and may combine certain learned functions vertically or in series, feeding the output of one learned function into the input of another learned function.

The combiner module 306 may determine which learned functions to combine, how to combine learned functions, or the like based on evaluation metadata for the learned functions from the metadata library 314, generated based on an evaluation of the learned functions using test data, as described below with regard to the function evaluator module 312. The combiner module 306 may request additional learned functions from the function generator module 301, for combining with other learned functions. For example, the combiner module 306 may request a new learned function with a particular input and/or output to combine with an existing learned function, or the like.

While the combining of learned functions may be informed by evaluation metadata for the learned functions, in certain embodiments, the combiner module 306 combines a large number of learned functions pseudo-randomly, forming a large number of combined functions. For example, the combiner module 306, in one embodiment, may determine each possible combination of generated learned functions, as many combinations of generated learned functions as possible given one or more limitations or constraints, a selected subset of combinations of generated learned functions, or the like, for evaluation by the function evaluator module 312. In certain embodiments, by generating a large number of combined learned functions, the combiner module 306 is statistically likely to form one or more combined learned functions that are useful and/or effective for the training data.

In the depicted embodiment, the machine learning compiler module 302 includes an extender module 308. The extender module 308, in certain embodiments, is configured to add one or more layers to a learned function. For example, the extender module 308 may extend a learned function or combined learned function by adding a probabilistic model layer, such as a Bayesian belief network layer, a Bayes classifier layer, a Boltzman layer, or the like.

Certain classes of learned functions, such as probabilistic models, may be configured to receive either instances of one or more features as input, or the output results of other learned functions, such as a classification and a confidence metric, or the like. The extender module 308 may use these types of learned functions to extend other learned functions. The extender module 308 may extend learned functions generated by the function generator module 301 directly, may extend combined learned functions from the combiner module 306, may extend other extended learned functions, may extend synthesized learned functions from the synthesizer module 310, or the like.

In one embodiment, the extender module 308 determines which learned functions to extend, how to extend learned functions, or the like based on evaluation metadata from the metadata library 314. The extender module 308, in certain embodiments, may request one or more additional learned functions from the function generator module 301 and/or one or more additional combined learned functions from the combiner module 306, for the extender module 308 to extend.

While the extending of learned functions may be informed by evaluation metadata for the learned functions, in certain embodiments, the extender module 308 generates a large number of extended learned functions pseudo-randomly. For example, the extender module 308, in one embodiment, may extend each possible learned function and/or combination of learned functions, may extend a selected subset of learned functions, may extend as many learned functions as possible given one or more limitations or constraints, or the like, for evaluation by the function evaluator module 312. In certain embodiments, by generating a large number of extended learned functions, the extender module 308 is statistically likely to form one or more extended learned functions and/or combined extended learned functions that are useful and/or effective for the training data.

In the depicted embodiment, the machine learning compiler module 302 includes a synthesizer module 310. The synthesizer module 310, in certain embodiments, is configured to organize a subset of learned functions into the machine learning ensemble 222, as synthesized learned functions 324. In a further embodiment, the synthesizer module 310 includes evaluation metadata from the metadata library 314 of the function evaluator module 312 in the machine learning ensemble 222 as a synthesized metadata rule set 322, so that the machine learning ensemble 222 includes synthesized learned functions 324 and evaluation metadata, the synthesized metadata rule set 322, for the synthesized learned functions 324.

The learned functions that the synthesizer module 310 synthesizes or organizes into the synthesized learned functions 324 of the machine learning ensemble 222, may include learned functions directly from the function generator module 301, combined learned functions from the combiner module 306, extended learned functions from the extender module 308, combined extended learned functions, or the like. As described below, in one embodiment, the function selector module 316 selects the learned functions for the synthesizer module 310 to include in the machine learning ensemble 222. In certain embodiments, the synthesizer module 310 organizes learned functions by preparing the learned functions and the associated evaluation metadata for processing workload data to reach a result. For example, as described below, the synthesizer module 310 may organize and/or synthesize the synthesized learned functions 324 and the synthesized metadata rule set 322 for the orchestration module 320 to use to direct workload data through the synthesized learned functions 324 to produce a result.

In one embodiment, the function evaluator module 312 evaluates the synthesized learned functions 324 that the synthesizer module 310 organizes, and the synthesizer module 310 synthesizes and/or organizes the synthesized metadata rule set 322 based on evaluation metadata that the function evaluation module 312 generates during the evaluation of the synthesized learned functions 324, from the metadata library 314 or the like.

In the depicted embodiment, the machine learning compiler module 302 includes a function evaluator module 312. The function evaluator module 312 is configured to evaluate learned functions using test data, or the like. The function evaluator module 312 may evaluate learned functions generated by the function generator module 301, learned functions combined by the combiner module 306 described above, learned functions extended by the extender module 308 described above, combined extended learned functions, synthesized learned functions 324 organized into the machine learning ensemble 222 by the synthesizer module 310 described above, or the like.

Test data for a learned function, in certain embodiments, comprises a different subset of the initialization data for the learned function than the function generator module 301 used as training data. The function evaluator module 312, in one embodiment, evaluates a learned function by inputting the test data into the learned function to produce a result, such as a prediction, a classification, a confidence metric, an inferred function, a regression function, an answer, a recognized pattern, a rule, a threshold, a setting, a recommendation, or another result.

Test data, in certain embodiments, comprises a subset of initialization data, with a feature associated with the requested result removed, so that the function evaluator module 312 may compare the result from the learned function to the instances of the removed feature to determine the accuracy and/or effectiveness of the learned function for each test instance. For example, if the learned function module 204 or another client has requested a machine learning ensemble 222 to predict whether a customer will be a repeat customer, and provided historical customer information as initialization data, the function evaluator module 312 may input a test data set comprising one or more features of the initialization data other than whether the customer was a repeat customer into the learned function, and compare the resulting predictions to the initialization data to determine the accuracy and/or effectiveness of the learned function.

The function evaluator module 312, in one embodiment, is configured to maintain evaluation metadata for an evaluated learned function in the metadata library 314. The evaluation metadata, in certain embodiments, comprises log data generated by the function generator module 301 while generating learned functions, the function evaluator module 312 while evaluating learned functions, or the like.

In one embodiment, the evaluation metadata includes indicators of one or more training data sets that the function generator module 301 used to generate a learned function. The evaluation metadata, in another embodiment, includes indicators of one or more test data sets that the function evaluator module 312 used to evaluate a learned function. In a further embodiment, the evaluation metadata includes indicators of one or more decisions made by and/or branches taken by a learned function during an evaluation by the function evaluator module 312. The evaluation metadata, in another embodiment, includes the results determined by a learned function during an evaluation by the function evaluator module 312. In one embodiment, the evaluation metadata may include evaluation metrics, learning metrics, effectiveness metrics, convergence metrics, or the like for a learned function based on an evaluation of the learned function. An evaluation metric, learning metrics, effectiveness metric, convergence metric, or the like may be based on a comparison of the results from a learned function to actual values from initialization data, and may be represented by a correctness indicator for each evaluated instance, a percentage, a ratio, or the like. Different classes of learned functions, in certain embodiments, may have different types of evaluation metadata.

The metadata library 314, in one embodiment, provides evaluation metadata for learned functions to the feature selector module 304, the predictive correlation module 318, the combiner module 306, the extender module 308, and/or the synthesizer module 310. The metadata library 314 may provide an API, a shared library, one or more function calls, or the like providing access to evaluation metadata. The metadata library 314, in various embodiments, may store or maintain evaluation metadata in a database format, as one or more flat files, as one or more lookup tables, as a sequential log or log file, or as one or more other data structures. In one embodiment, the metadata library 314 may index evaluation metadata by learned function, by feature, by instance, by training data, by test data, by effectiveness, and/or by another category or attribute and may provide query access to the indexed evaluation metadata. The function evaluator module 312 may update the metadata library 314 in response to each evaluation of a learned function, adding evaluation metadata to the metadata library 314 or the like.

The function selector module 316, in certain embodiments, may use evaluation metadata from the metadata library 314 to select learned functions for the combiner module 306 to combine, for the extender module 308 to extend, for the synthesizer module 310 to include in the machine learning ensemble 222, or the like. For example, in one embodiment, the function selector module 316 may select learned functions based on evaluation metrics, learning metrics, effectiveness metrics, convergence metrics, or the like. In another embodiment, the function selector module 316 may select learned functions for the combiner module 306 to combine and/or for the extender module 308 to extend based on features of training data used to generate the learned functions, or the like.

The machine learning ensemble 222, in certain embodiments, provides predictive results for an analysis request by processing workload data of the analysis request using a plurality of learned functions (e.g., the synthesized learned functions 324). As described above, results from the machine learning ensemble 222, in various embodiments, may include a prediction, a classification, a confidence metric, an inferred function, a regression function, an answer, a recognized pattern, a rule, a threshold, a setting, a recommendation, and/or another result. For example, in one embodiment, the machine learning ensemble 222 provides a classification or prediction and a confidence metric or another result for each instance of workload data input into the machine learning ensemble 222, or the like. Workload data, in certain embodiments, may be substantially similar to test data, but the missing feature from the initialization data is not known, and is to be solved for by the machine learning ensemble 222. A classification, in certain embodiments, comprises a value for a missing feature in an instance of workload data, such as a prediction, an answer, or the like. For example, if the missing feature represents a question, the classification may represent a predicted answer, and the associated confidence metric may be an estimated strength or accuracy of the predicted answer. A classification, in certain embodiments, may comprise a binary value (e.g., yes or no), a rating on a scale (e.g., 4 on a scale of 1 to 5), or another data type for a feature. A confidence metric, in certain embodiments, may comprise a percentage, a ratio, a rating on a scale, or another indicator of accuracy, effectiveness, and/or confidence.

In the depicted embodiment, the machine learning ensemble 222 includes an orchestration module 320. The orchestration module 320, in certain embodiments, is configured to direct workload data through the machine learning ensemble 222 to produce a result, such as a prediction, a classification, a confidence metric, an inferred function, a regression function, an answer, a recognized pattern, a rule, a threshold, a setting, a recommendation, and/or another result. In one embodiment, the orchestration module 320 uses evaluation metadata from the function evaluator module 312 and/or the metadata library 314, such as the synthesized metadata rule set 322, to determine how to direct workload data through the synthesized learned functions 324 of the machine learning ensemble 222. As described below with regard to FIG. 8, in certain embodiments, the synthesized metadata rule set 322 comprises a set of rules or conditions from the evaluation metadata of the metadata library 314 that indicate to the orchestration module 320 which features, instances, or the like should be directed to which synthesized learned function 324.

For example, the evaluation metadata from the metadata library 314 may indicate which learned functions were trained using which features and/or instances, how effective different learned functions were at making predictions based on different features and/or instances, or the like. The synthesizer module 310 may use that evaluation metadata to determine rules for the synthesized metadata rule set 322, indicating which features, which instances, or the like the orchestration module 320 the orchestration module 320 should direct through which learned functions, in which order, or the like. The synthesized metadata rule set 322, in one embodiment, may comprise a decision tree or other data structure comprising rules which the orchestration module 320 may follow to direct workload data through the synthesized learned functions 324 of the machine learning ensemble 222.

In one embodiment, the translation module 326 translates the output of the synthesized learned functions 324 into a rule, threshold, recommendation, configuration adjustment, combined result, or other result for the result module 206 to use. For example, in certain embodiments as described above, the synthesized learned functions 324 may provide a prediction, a classification, a confidence metric, an inferred function, a regression function, an answer, a subset of the instances, a subset of the one or more features, or the like as an output or result.

In certain embodiments, the synthesized learned functions 324 may not be configured to output a desired result, such as a rule, a threshold, a setting, a recommendation, a configuration adjustment, a query result, a combined result, or the like directly, and the translation module 326 may translate the output of one or more synthesized learned functions 324, one or more machine learning ensembles 322, or the like into a rule, threshold, recommendation, configuration adjustment, query result, combined result, or other result with the result module 206 may use. The translation module 324 my programmatically translate or transform results according to a predefined schema or definition of a rule, setting, threshold, or policy of the data management product 108.

For example, the translation module 326 may combine multiple results, results from multiple machine learning ensembles 222, or the like (e.g., multiple classifications, multiple confidence metrics, or other results) into a single result for a user 110 or other client 104 of the data management product 108. In other embodiments, the machine learning ensemble 222 and/or the synthesized learned functions 324 may be configured to output a desired result directly for the result module 206, without a translation module 326.

Figure 4:
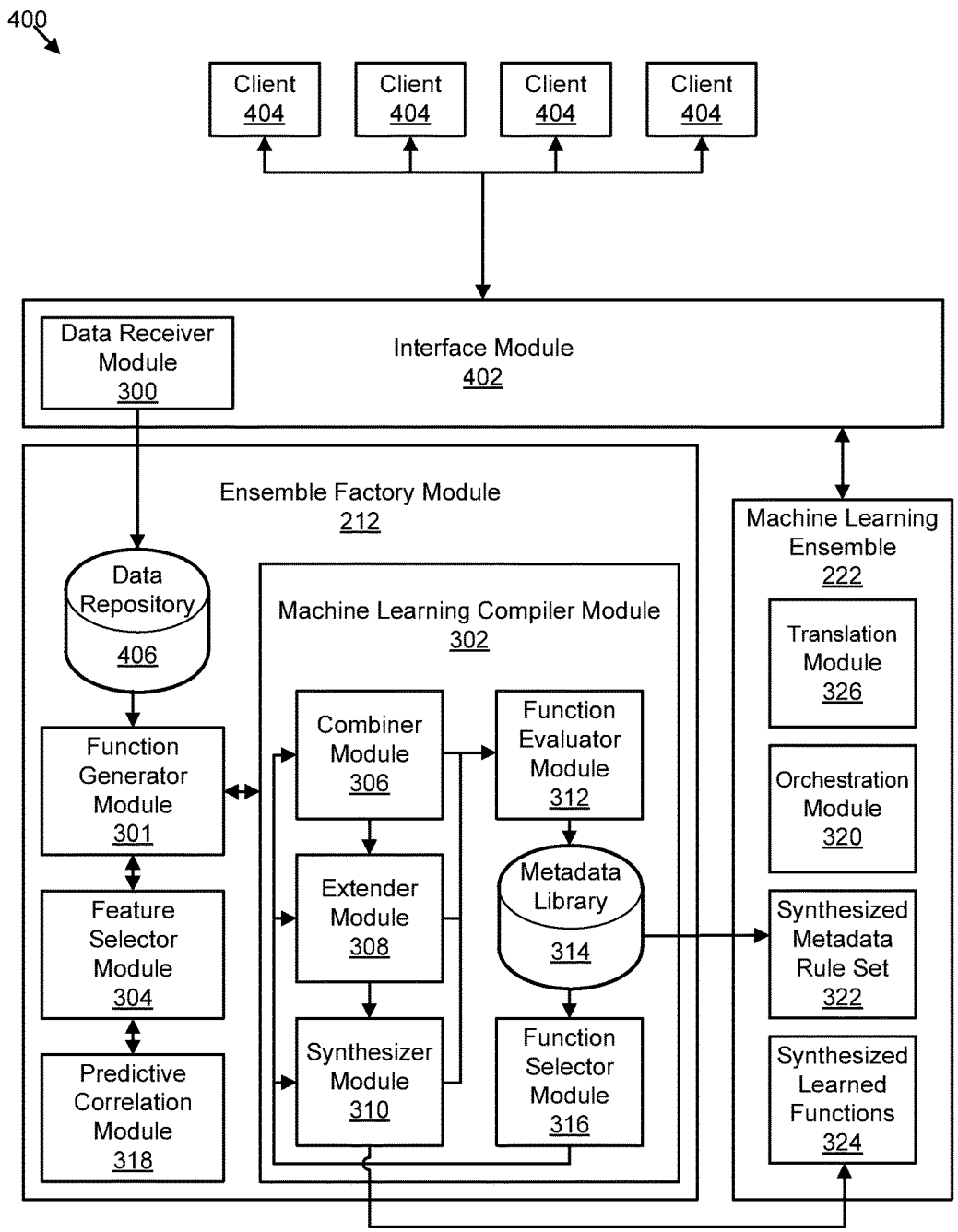
FIG. 4 is a schematic block diagram illustrating one embodiment of a system for an ensemble factory.

FIG. 4 depicts one embodiment of a system 400 for an ensemble factory. The system 400, in the depicted embodiment, includes several clients 404 in communication with an interface module 402 either locally or over a data network 106. The ensemble factory module 212 of FIG. 4 is substantially similar to the ensemble factory module 212 of FIG. 3, but further includes an interface module 402 and a data repository 406.

The interface module 402, in certain embodiments, is configured to receive requests from clients 404, to provide results to a client 404, or the like. The learned function module 202, for example, may act as a client 404, requesting a machine learning ensemble 222 from the interface module 402 for use with data from the input module 202 or the like. The interface module 402 may provide a machine learning interface to clients 404, such as an API, a shared library, a hardware command interface, or the like, over which clients 404 may make requests and receive results. The interface module 402 may support new ensemble requests from clients 404, allowing clients to request generation of a new machine learning ensemble 222 from the ensemble factory module 212 or the like. As described above, a new ensemble request may include initialization data; one or more ensemble parameters; a feature, query, question or the like for which a client 404 would like a machine learning ensemble 222 to predict a result; or the like. The interface module 402 may support analysis requests for a result from a machine learning ensemble 222. As described above, an analysis request may include workload data; a feature, query, question or the like; a machine learning ensemble 222; or may include other analysis parameters.

In certain embodiments, the ensemble factory module 212 may maintain a library of generated machine learning ensembles 222, from which clients 404 may request results. In such embodiments, the interface module 402 may return a reference, pointer, or other identifier of the requested machine learning ensemble 222 to the requesting client 404, which the client 404 may use in analysis requests. In another embodiment, in response to the ensemble factory module 212 generating a machine learning ensemble 222 to satisfy a new ensemble request, the interface module 402 may return the actual machine learning ensemble 222 to the client 404, for the client 404 to manage, and the client 404 may include the machine learning ensemble 222 in each analysis request.

The interface module 402 may cooperate with the ensemble factory module 212 to service new ensemble requests, may cooperate with the machine learning ensemble 222 to provide a result to an analysis request, or the like. The ensemble factory module 212, in the depicted embodiment, includes the function generator module 301, the feature selector module 304, the predictive correlation module 318, and the machine learning compiler module 302, as described above. The ensemble factory module 212, in the depicted embodiment, also includes a data repository 406, The data repository 406, in one embodiment, stores initialization data, so that the function generator module 301, the feature selector module 304, the predictive correlation module 318, and/or the machine learning compiler module 302 may access the initialization data to generate, combine, extend, evaluate, and/or synthesize learned functions and machine learning ensembles 222. The data repository 406 may provide initialization data indexed by feature, by instance, by training data subset, by test data subset, by new ensemble request, or the like. By maintaining initialization data in a data repository 406, in certain embodiments, the ensemble factory module 212 ensures that the initialization data is accessible throughout the machine learning ensemble 222 building process, for the function generator module 301 to generate learned functions, for the feature selector module 304 to determine which features should be used in the machine learning ensemble 222, for the predictive correlation module 318 to determine which features correlate with the highest confidence metrics, for the combiner module 306 to combine learned functions, for the extender module 308 to extend learned functions, for the function evaluator module 312 to evaluate learned functions, for the synthesizer module 310 to synthesize learned functions 324 and/or metadata rule sets 322, or the like.

In the depicted embodiment, the data receiver module 300 is integrated with the interface module 402, to receive initialization data, including training data and test data, from new ensemble requests. The data receiver module 300 stores initialization data in the data repository 406. The function generator module 301 is in communication with the data repository 406, in one embodiment, so that the function generator module 301 may generate learned functions based on training data sets from the data repository 406. The feature selector module 300 and/or the predictive correlation module 318, in certain embodiments, may cooperate with the function generator module 301 and/or the machine learning compiler module 302 to determine which features to use in the machine learning ensemble 222, which features are most predictive or correlate with the highest confidence metrics, or the like.

Within the machine learning compiler module 302, the combiner module 306, the extender module 308, and the synthesizer module 310 are each in communication with both the function generator module 301 and the function evaluator module 312. The function generator module 301, as described above, may generate an initial large amount of learned functions, from different classes or the like, which the function evaluator module 312 evaluates using test data sets from the data repository 406. The combiner module 306 may combine different learned functions from the function generator module 301 to form combined learned functions, which the function evaluator module 312 evaluates using test data from the data repository 406. The combiner module 306 may also request additional learned functions from the function generator module 301.

The extender module 308, in one embodiment, extends learned functions from the function generator module 301 and/or the combiner module 306. The extender module 308 may also request additional learned functions from the function generator module 301. The function evaluator module 312 evaluates the extended learned functions using test data sets from the data repository 406. The synthesizer module 310 organizes, combines, or otherwise synthesizes learned functions from the function generator module 301, the combiner module 306, and/or the extender module 308 into synthesized learned functions 324 for the machine learning ensemble 222. The function evaluator module 312 evaluates the synthesized learned functions 324, and the synthesizer module 310 organizes or synthesizes the evaluation metadata from the metadata library 314 into a synthesized metadata rule set 322 for the synthesized learned functions 324.

As described above, as the function evaluator module 312 evaluates learned functions from the function generator module 301, the combiner module 306, the extender module 308, and/or the synthesizer module 310, the function evaluator module 312 generates evaluation metadata for the learned functions and stores the evaluation metadata in the metadata library 314. In the depicted embodiment, in response to an evaluation by the function evaluator module 312, the function selector module 316 selects one or more learned functions based on evaluation metadata from the metadata library 314. For example, the function selector module 316 may select learned functions for the combiner module 306 to combine, for the extender module 308 to extend, for the synthesizer module 310 to synthesize, or the like.

Figure 5:
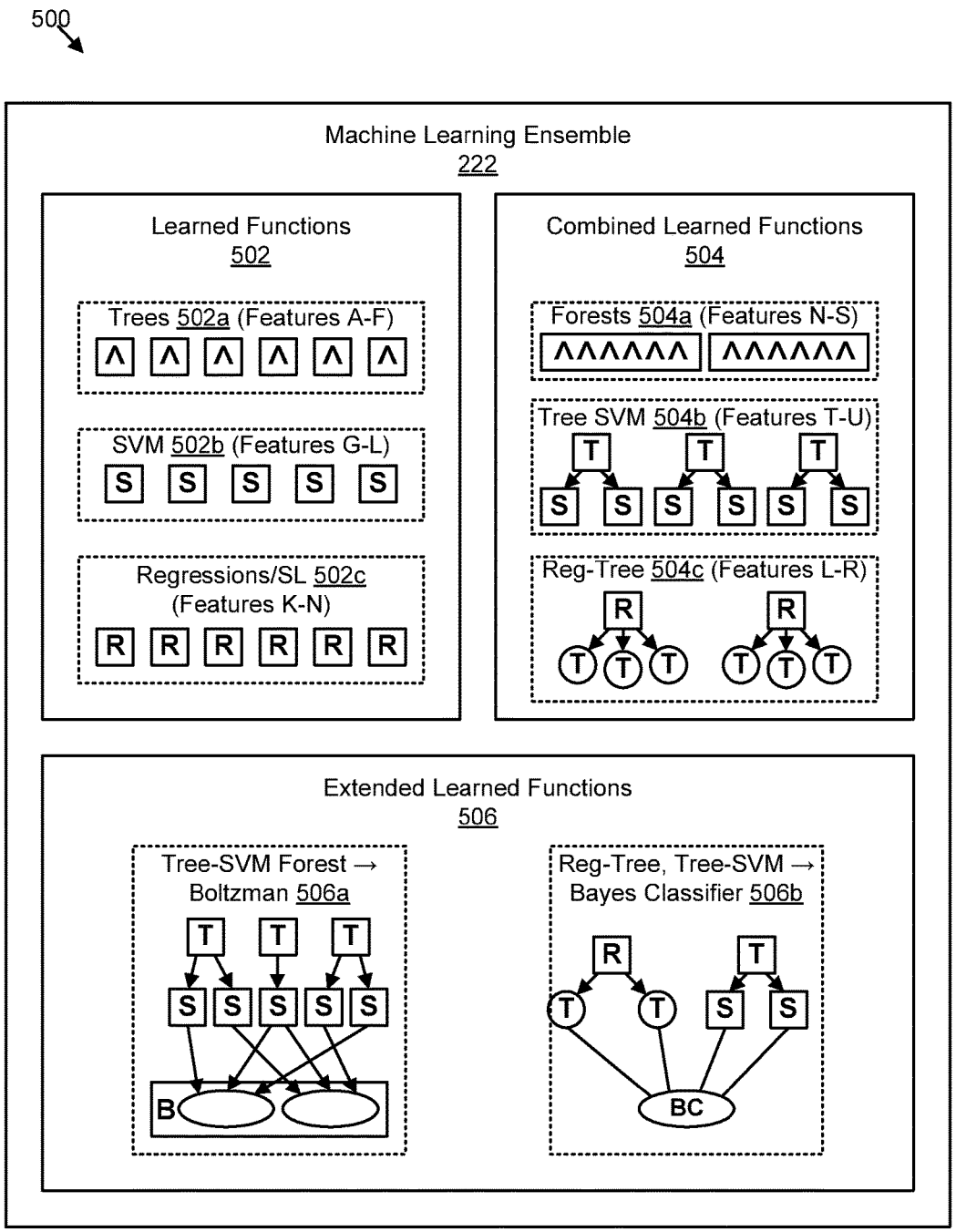
FIG. 5 is a schematic block diagram illustrating one embodiment of learned functions for a machine learning ensemble.

FIG. 5 depicts one embodiment 500 of learned functions 502, 504, 506 for a machine learning ensemble 222. The learned functions 502, 504, 506 are presented by way of example, and in other embodiments, other types and combinations of learned functions may be used, as described above. Further, in other embodiments, the machine learning ensemble 222 may include an orchestration module 320, a synthesized metadata rule set 322, or the like. In one embodiment, the function generator module 301 generates the learned functions 502. The learned functions 502, in the depicted embodiment, include various collections of selected learned functions 502 from different classes including a collection of decision trees 502a, configured to receive or process a subset A-F of the feature set of the machine learning ensemble 222, a collection of support vector machines ("SVMs") 502b with certain kernels and with an input space configured with particular subsets of the feature set G-L, and a selected group of regression models 502c, here depicted as a suite of single layer ("SL") neural nets trained on certain feature sets K-N.

The example combined learned functions 504, combined by the combiner module 306 or the like, include various instances of forests of decision trees 504a configured to receive or process features N-S, a collection of combined trees with support vector machine decision nodes 504b with specific kernels, their parameters and the features used to define the input space of features T-U, as well as combined functions 504c in the form of trees with a regression decision at the root and linear, tree node decisions at the leaves, configured to receive or process features L-R.

Component class extended learned functions 506, extended by the extender module 308 or the like, include a set of extended functions such as a forest of trees 506a with tree decisions at the roots and various margin classifiers along the branches, which have been extended with a layer of Boltzman type Bayesian probabilistic classifiers. Extended learned function 506b includes a tree with various regression decisions at the roots, a combination of standard tree 504b and regression decision tree 504c and the branches are extended by a Bayes classifier layer trained with a particular training set exclusive of those used to train the nodes.

Figure 6:
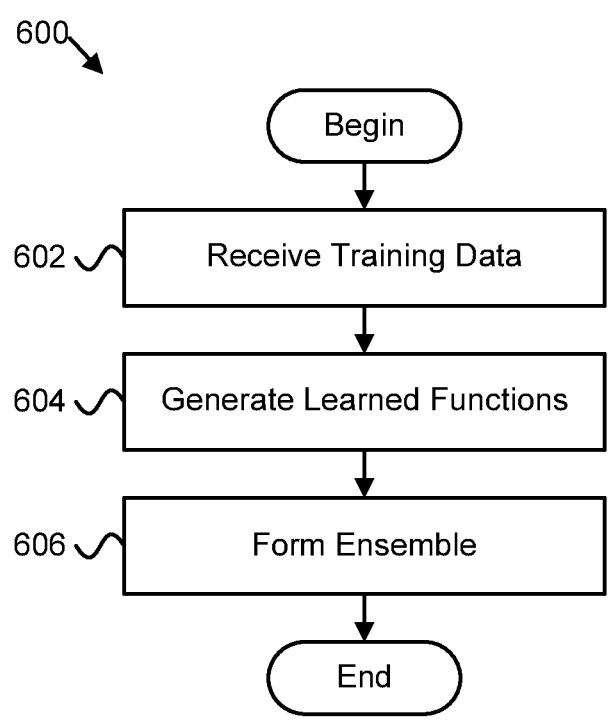
FIG. 6 is a schematic flow chart diagram illustrating one embodiment of a method for an ensemble factory.

FIG. 6 depicts one embodiment of a method 600 for an ensemble factory. The method 600 begins, and the data receiver module 300 receives 602 training data. The function generator module 301 generates 604 a plurality of learned functions from multiple classes based on the received 602 training data. The machine learning compiler module 302 forms 606 a machine learning ensemble comprising a subset of learned functions from at least two classes, and the method 600 ends.

Figure 7:
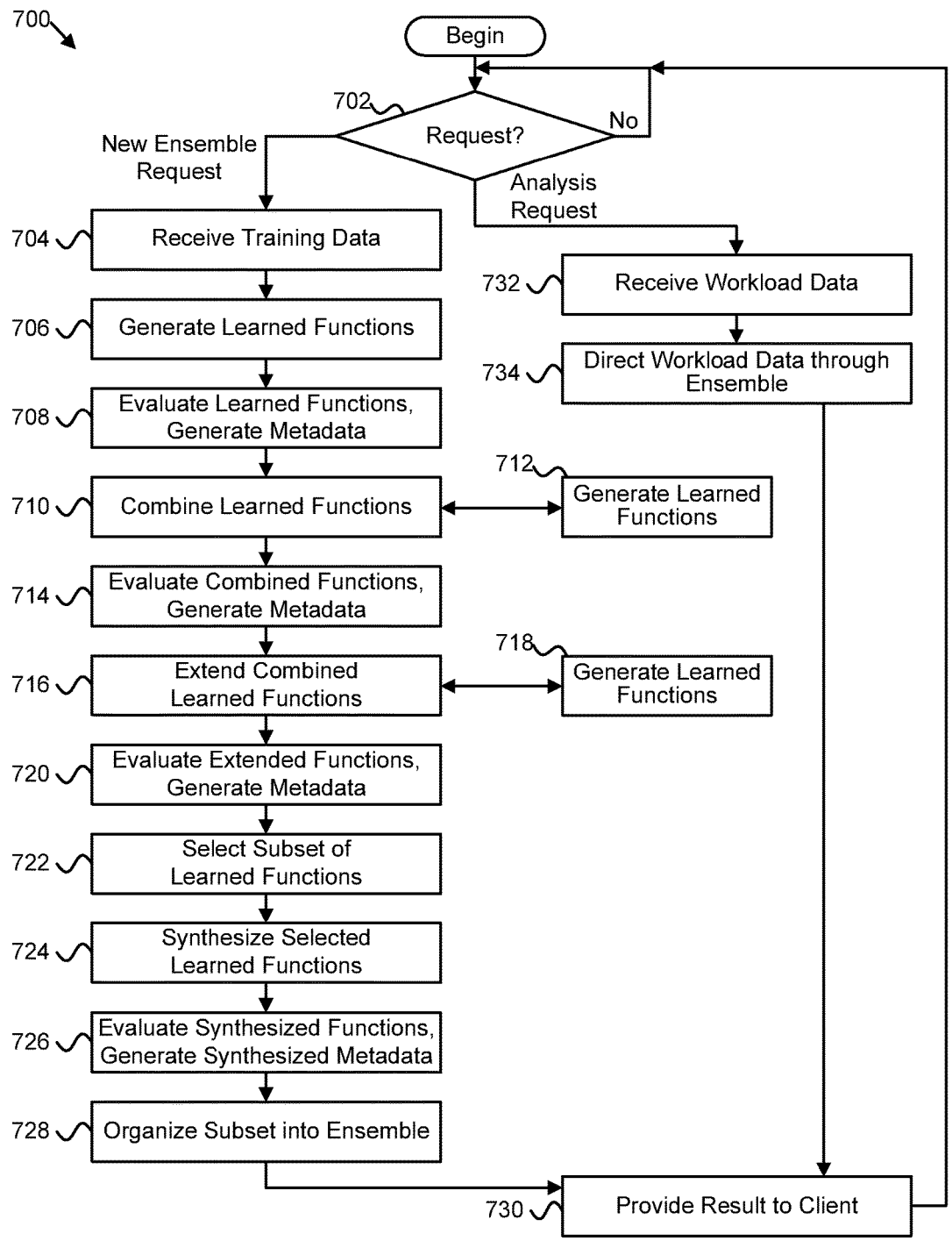
FIG. 7 is a schematic flow chart diagram illustrating another embodiment of a method for an ensemble factory.

FIG. 7 depicts another embodiment of a method 700 for an ensemble factory. The method 700 begins, and the interface module 402 monitors 702 requests until the interface module 402 receives 702 a machine learning request from a client 404 or the like.

If the interface module 402 receives 702 a new ensemble request, the data receiver module 300 receives 704 training data for the new ensemble, as initialization data or the like. The function generator module 301 generates 706 a plurality of learned functions based on the received 704 training data, from different machine learning classes. The function evaluator module 312 evaluates 708 the plurality of generated 706 learned functions to generate evaluation metadata. The combiner module 306 combines 710 learned functions based on the metadata from the evaluation 708. The combiner module 306 may request that the function generator module 301 generate 712 additional learned functions for the combiner module 306 to combine.

The function evaluator module 312 evaluates 714 the combined 710 learned functions and generates additional evaluation metadata. The extender module 308 extends 716 one or more learned functions by adding one or more layers to the one or more learned functions, such as a probabilistic model layer or the like. In certain embodiments, the extender module 308 extends 716 combined 710 learned functions based on the evaluation 712 of the combined learned functions. The extender module 308 may request that the function generator module 301 generate 718 additional learned functions for the extender module 308 to extend. The function evaluator module 312 evaluates 720 the extended 716 learned functions. The function selector module 316 selects 722 at least two learned functions, such as the generated 706 learned functions, the combined 710 learned functions, the extended 716 learned functions, or the like, based on evaluation metadata from one or more of the evaluations 708, 714, 720.

The synthesizer module 310 synthesizes 724 the selected 722 learned functions into synthesized learned functions 324. The function evaluator module 312 evaluates 726 the synthesized learned functions 324 to generate a synthesized metadata rule set 322. The synthesizer module 310 organizes 728 the synthesized 724 learned functions 324 and the synthesized metadata rule set 322 into a machine learning ensemble 222. The interface module 402 provides 730 a result to the requesting client 404, such as the machine learning ensemble 222, a reference to the machine learning ensemble 222, an acknowledgment, or the like, and the interface module 402 continues to monitor 702 requests.

If the interface module 402 receives 702 an analysis request, the data receiver module 300 receives 732 workload data associated with the analysis request. The orchestration module 320 directs 734 the workload data through a machine learning ensemble 222 associated with the received 702 analysis request to produce a result, such as a prediction, a classification, a confidence metric, an inferred function, a regression function, an answer, a recognized pattern, a rule, a threshold, a setting, a recommendation, and/or another result. The interface module 402 provides 730 the produced result to the requesting client 404, and the interface module 402 continues to monitor 702 requests.

Figure 8:
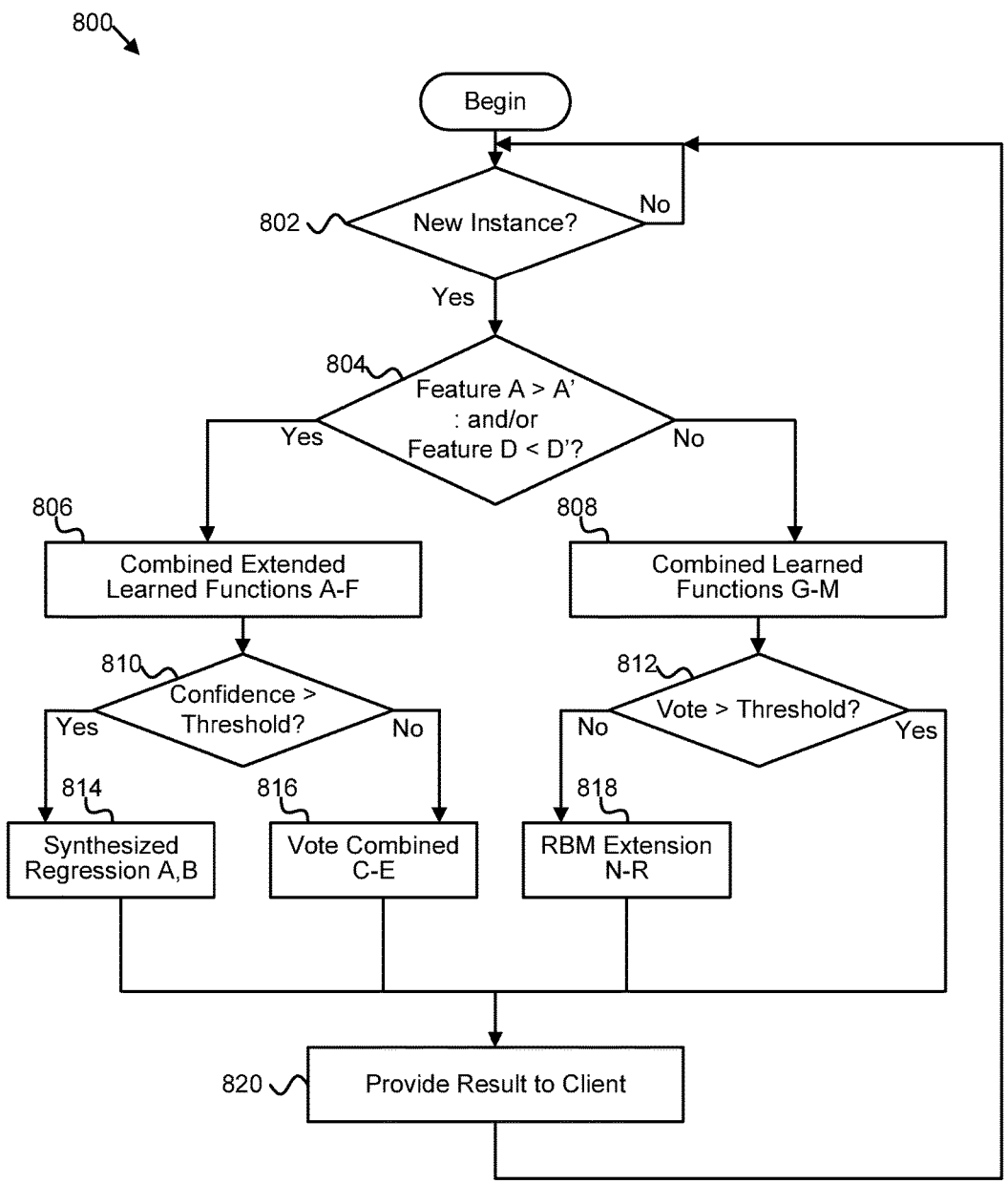
FIG. 8 is a schematic flow chart diagram illustrating one embodiment of a method for directing data through a machine learning ensemble.

FIG. 8 depicts one embodiment of a method 800 for directing data through a machine learning ensemble. The specific synthesized metadata rule set 322 of the depicted method 800 is presented by way of example only, and many other rules and rule sets may be used.

A new instance of workload data is presented 802 to the machine learning ensemble 222 through the interface module 402. The data is processed through the data receiver module 300 and configured for the particular analysis request as initiated by a client 404. In this embodiment the orchestration module 320 evaluates a certain set of features associates with the data instance against a set of thresholds contained within the synthesized metadata rule set 322.

A binary decision 804 passes the instance to, in one case, a certain combined and extended function 806 configured for features A-F or in the other case a different, parallel combined function 808 configured to predict against a feature set G-M. In the first case 806, if the output confidence passes 810 a certain threshold as given by the metadata rule set the instance is passed to a synthesized, extended regression function 814 for final evaluation, else the instance is passed to a combined collection 816 whose output is a weighted voted based processing a certain set of features. In the second case 808 a different combined function 812 with a simple vote output results in the instance being evaluated by a set of base learned functions extended by a Boltzman type extension 818 or, if a prescribed threshold is meet the output of the synthesized function is the simple vote. The interface module 402 provides 820 the result of the orchestration module directing workload data through the machine learning ensemble 222 to a requesting client 404 and the method 800 continues.

Figure 9:
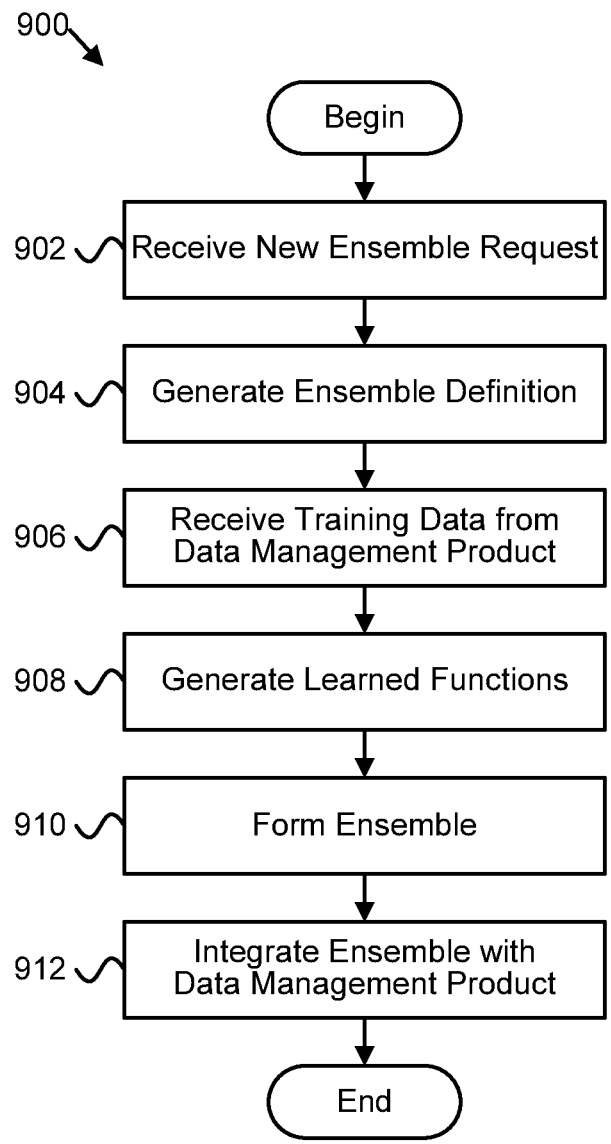
FIG. 9 is a schematic flow chart diagram illustrating one embodiment of a method for integrating machine learning with a data management product.

FIG. 9 depicts one embodiment of a method 900 for integrating machine learning with a data management product 108. The method 900 begins, and the input module 202 and/or the interface module 402 receives 902 a new ensemble request. In certain embodiments the new ensemble request is in a native language of the data management product 108 and the input module 202 and/or the interface module 402 receives 902 the new ensemble request in cooperation with the data management product. The learned function module 204, in cooperation with the ensemble factory module 212 or the like, generates 904 an ensemble definition for the received 902 new ensemble request.

The input module 202 and/or the data receiver module 300 receive 906 training data specified by the received 902 new ensemble request from the data management product 108. The function generator module 301 generates 908 a plurality of learned functions from multiple classes based on the received 906 training data. The machine learning compiler module 302 forms 910 a machine learning ensemble 222 comprising a subset of learned functions from at least two classes. The learned function module 204, in cooperation with the ensemble factory module 212 or the like, integrates 912 the machine learning ensemble 222 with the data management product 108 and the method 900 ends.

Figure 10:
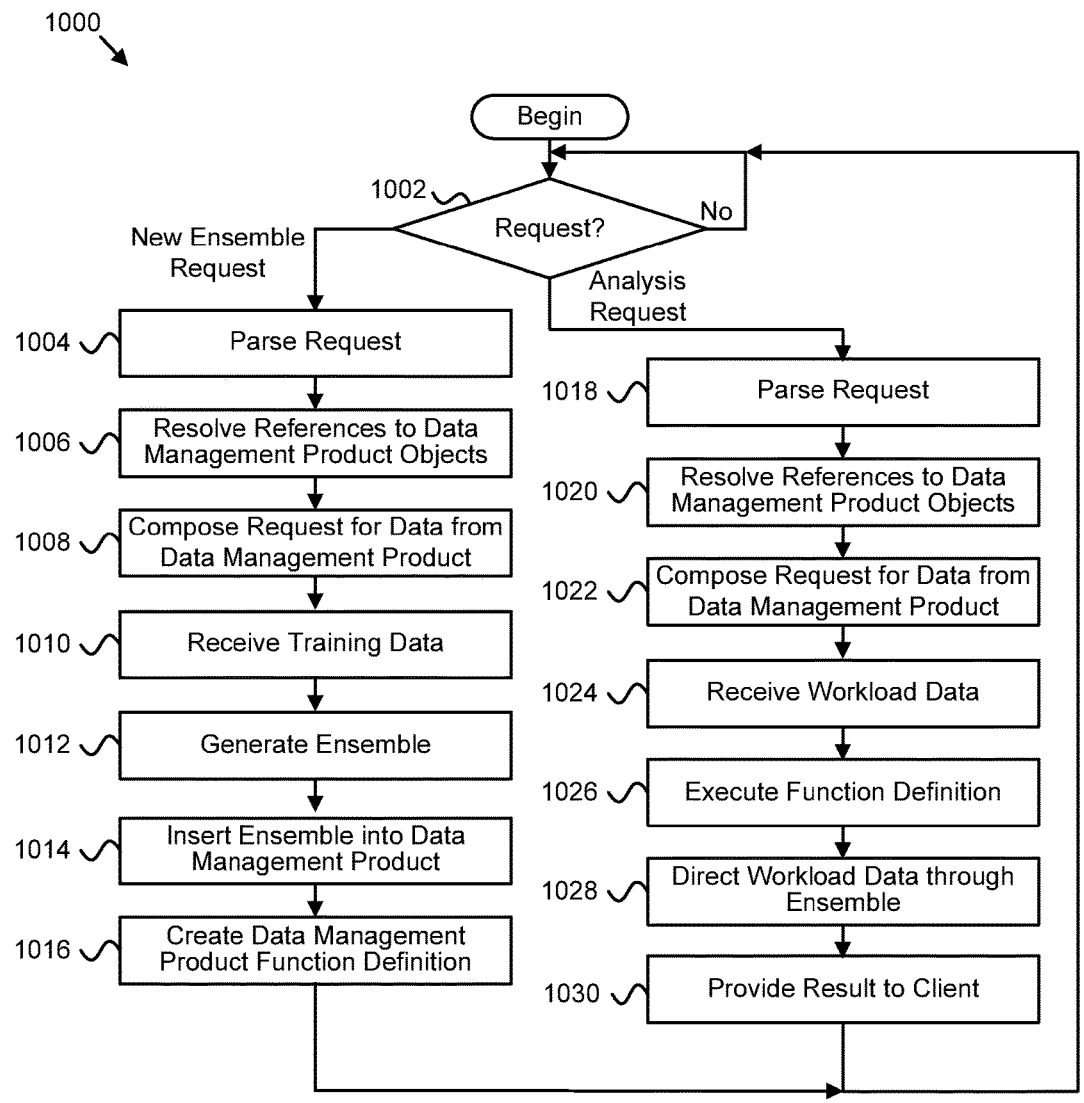
FIG. 10 is a schematic flow chart diagram illustrating another embodiment of a method for integrating machine learning with a data management product.

FIG. 10 depicts another embodiment of a method 1000 for integrating machine learning with a data management product 108. The method 1000 begins, and the input module 202 and/or the interface module 402 monitors 1002 requests until the input module 202 and/or the interface module 402 receives 1002 a machine learning request from a user 110 or other client 104.

If the input module 202 and/or the interface module 402 receives 1002 a new ensemble request, the input module 202 and/or the interface module 402 parses 1004 the new ensemble request to resolve 1006 references to objects or other data of the data management product 108. The input module 202 and/or the interface module 402 composes 1008 a request to fetch training data from the data management product 108 based on the parsed 1004 new ensemble request. The input module 202 and/or the data receiver module 300 receive 1010 the requested training data from the data management product 108. The ensemble factory module 212 generates 1012 a machine learning ensemble 222, as described above with regard to FIGS. 6, 7, 9, or the like. The learned function module 204, in cooperation with the ensemble factory module 212 or the like, inserts 1014 the generated 1012 machine learning ensemble 222 into the data management product and creates 1016 a data management product function definition within the data management product 108 for the machine learning ensemble 222. The method 100 continues.

If the input module 202 and/or the interface module 402 receives 1002 an analysis request, the input module 202 and/or the interface module 402 parses 1018 the analysis request to resolve 1020 references to objects or other data of the data management product 108. The input module 202 and/or the interface module 402 composes 1022 a request to fetch workload data from the data management product 108 based on the parsed 1018 analysis request. The input module 202 and/or the data receiver module 300 receive 1024 the requested workload data from the data management product 108. The learned function module 204, in cooperation with the orchestration module 320 or the like, executes 1026 the data management product function definition to direct 1028 the workload data through the machine learning ensemble 222 associated with the received 1002 analysis request to produce a result, such as a prediction, a classification, a confidence metric, an inferred function, a regression function, an answer, a recognized pattern, a rule, a threshold, a setting, a recommendation, and/or another result. The result module 206 and/or the interface module 402 provide 1030 the produced result to the requesting user 110 or other client 104, and the method 1000 continues.

What is claimed is:

1. An apparatus for machine learning in a data management product, the apparatus comprising:
   an ensemble factory module configured to create one or more machine learning ensembles by:
      training functions for the one or more machine learning ensembles using training data from a data management product; and
      combining two or more of the trained functions to form each of the one or more machine learning ensembles;
   an input module configured to receive an analysis request for the data management product through one or more of a native query language and a native interface of the data management product, the analysis request comprising a request for a prediction of one or more unknown values for the data management product, the one or more of the native query language and the native interface comprising a default set of functions for the data management product that are modified by integrating the one or more machine learning ensembles into the data management product by altering the default set of functions of the data management product using a data definition language;
   a learned function module configured to execute the one or more machine learning ensembles to predict the one or more unknown values for the data management product using workload data from the data management product in response to the analysis request; and
   a result module configured to:
      access an underlying data structure of the data management product from a storage device;
      modify the underlying data structure of the data management product by inserting the one or more unknown values that are predicted using the machine learning ensembles into the underlying data structure; and
      provide native access, within the data management product, to the modified data structure comprising the one or more unknown values through one or more of the native query language and the native interface of the data management product,
   wherein the ensemble factory module, the input module, the learned function module, and the result module each comprise code executed by a processor.

2. The apparatus of claim 1, wherein one or more of the input module, the learned function module, and the result module are integrated with the data management product as one or more of an add-on, a plug-in, and an extension.

3. The apparatus of claim 1, wherein the results module is further configured to provide native access, within the data management product, to a confidence value corresponding to each of the predicted values for the one or more unknown values.

4. A method for machine learning in a data management product, the method comprising:
   creating one or more machine learning ensembles by:
      training functions for the one or more machine learning ensembles using training data from a data management product, the data management product comprising a spreadsheet product; and
      combining two or more of the trained functions to form each of the one or more machine learning ensembles;
   receiving an analysis request for the spreadsheet product through one or more of a native query language and a native graphical interface of the spreadsheet product, the analysis request comprising a request for a prediction of one or more unknown values for a data set graphically presented within the native graphical interface of the spreadsheet product, the one or more of the native query language and the native interface comprising a default set of functions for the spreadsheet product that are modified by integrating the one or more machine learning ensembles into the spreadsheet product by altering the default set of functions of the spreadsheet product using a data definition language;
   executing the one or more machine learning ensembles to predict the one or more unknown values for the data set of the spreadsheet product using workload data from the spreadsheet product in response to the analysis request;

accessing an underlying data structure of the spreadsheet product from a storage device;

modifying the underlying data structure of the spreadsheet product by inserting the one or more unknown values that are predicted using the machine learning ensembles into the underlying data structure; and providing native access, through one or more of the native query language and the native graphical interface of the spreadsheet product, to the modified data structure comprising the one or more unknown values to visually populate one or more of a row and a column of the native graphical interface of the spreadsheet product with the one or more unknown values.

5. The method of claim 4, further comprising providing native access, within the spreadsheet product, to a confidence value corresponding to each of the predicted values for the one or more unknown values.

6. The method of claim 4, further comprising modifying a data structure of the spreadsheet product to store the one or more predicted values.

7. The method of claim 4, further comprising receiving a request from the spreadsheet product to generate a new machine learning ensemble, wherein generating the one or more machine learning ensembles comprises:

receiving the training data, the training data associated with the new ensemble request;

generating a plurality of learned functions by training functions for the new machine learning ensemble using the training data;

evaluating the plurality of learned functions using test data, the test data comprising a subset of the training data that is used to determine the accuracy of the plurality of learned functions; and forming a new machine learning ensemble comprising two or more learned functions based on the evaluation of the plurality of learned functions.

8. The method of claim 7, wherein the plurality of learned functions are generated from multiple classes of machine learning using the training data; and the machine learning ensemble is formed by combining a subset of the plurality of learned functions from at least two classes of the multiple classes.

9. The method of claim 4, wherein generating the one or more machine learning ensembles further comprises:

evaluating the combination of two or more trained functions;

extending the combination of two or more trained functions with one or more layers, at least one of the layers comprising a probabilistic model;

evaluating the extended combination of two or more trained functions using test data;

selecting a subset of the extended combination of two or more trained functions;

synthesizing the selected subset of the extended combination of two or more trained functions with metadata generated based on evaluating the combination of two or more trained functions and evaluating the extended combination of two or more trained functions; and organizing the synthesized subset into a machine learning ensemble.

10. The method of claim 4, wherein the one or more machine learning ensembles are generated automatically in response to one or more of a command and a query from a user of the spreadsheet product.

11. The method of claim 10, further comprising creating one or more new machine learning ensembles in response to a trigger event.

12. The method of claim 11, wherein the trigger event includes one or more of a change in data stored in the spreadsheet product, a manual update request, and a passing of a predetermined amount of time.

13. A method for machine learning in a data management product, the method comprising:

providing a machine learning module in communication with a data management product, the data management product comprising a database product;

transmitting a new ensemble request from the database product to the machine learning module;

receiving training data from the database product, the training data comprising historical values that are used to predict one or more unknown values related to an analysis request;

generating a plurality of learned functions by training functions using the training data;

forming a machine learning ensemble by combining two of more of the plurality of learned functions;

receiving an analysis request for the database product through one or more of a native query language and a native interface of the database product, the analysis request comprising a request for a prediction of one or unknown values for a data set of the database product in response to the analysis request;

executing the machine learning ensemble to predict the one or more unknown values for the data set of the database product using workload data from the database product;

accessing an underlying data structure of the database product from a storage device;

modifying the underlying data structure of the database product by inserting the one or more unknown values that are predicted using the machine learning ensembles into the underlying data structure; and integrating the machine learning ensemble with the database product to provide native access to the modified data structure comprising the one or more unknown values within the database product by modifying a default set of functions for the database product that represent one or more of the native query language and the native interface by altering the default set of functions of the data management product using a data definition language.

14. The method of claim 13, wherein forming a machine learning ensemble based on the plurality of learned functions further comprises:

evaluating the plurality of learned function;

combining the plurality of learned functions in a plurality of learned function combinations;

evaluating the plurality of learned function combinations;

extending the plurality of learned function combinations with one or more layers, at least one of the layers comprising a probabilistic model;

evaluating the extended combined learned functions using test data;

selecting a subset of the extended combined learned functions;

synthesizing the selected subset of the extended combined learned functions with metadata generated based on evaluating the plurality of learned function combinations and evaluating the extended combined learned functions; and organizing the synthesized subset into a machine learning ensemble.

* * * * *